(12) United States Patent
Otani et al.

(10) Patent No.: US 6,574,436 B2
(45) Date of Patent: *Jun. 3, 2003

(54) IMAGE BLUR COMPENSATION DEVICE WITH REDUCED NOISE EFFECT MECHANISM

(75) Inventors: Tadashi Otani, Otawara (JP); Jun Matsushima, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/710,108

(22) Filed: Sep. 12, 1996

(65) Prior Publication Data

US 2003/0012565 A1 Jan. 16, 2003

(30) Foreign Application Priority Data

Sep. 14, 1995 (JP) ............................................. 7-237433

(51) Int. Cl.[7] .............................. G03B 17/00; G03B 7/26
(52) U.S. Cl. .............................. 396/52; 396/303; 396/55
(58) Field of Search ............................ 396/52, 55, 280, 396/301, 302, 452, 453, 454, 53, 54, 87, 303

(56) References Cited

U.S. PATENT DOCUMENTS

| | | | | |
|---|---|---|---|---|
| 5,210,563 A | | 5/1993 | Hamada et al. ............... 354/400 |
| 5,235,378 A | * | 8/1993 | Tominaga et al. ........... 396/303 |
| 5,309,190 A | * | 5/1994 | Shinohara et al. ........ 354/195.1 |
| 5,502,536 A | * | 3/1996 | Amanuma et al. ........... 354/400 |
| 5,576,788 A | * | 11/1996 | Miyazawa et al. ............. 396/52 |
| 5,585,875 A | * | 12/1996 | Imafuji et al. ................ 396/55 |
| 6,256,457 B1 | * | 7/2001 | Miyamoto et al. ............. 396/52 |

FOREIGN PATENT DOCUMENTS

| | | | | |
|---|---|---|---|---|
| JP | 7-218969 | * | 8/1995 | ............ G03B/5/00 |
| JP | 7-281241 | * | 10/1995 | ............ G03B/5/00 |

* cited by examiner

Primary Examiner—Christopher Mahoney

(57) ABSTRACT

An image blur compensation device including a mechanism that can effectively reduce the effects of noise which becomes a problem in image blur compensation devices which are used in still cameras, video cameras, and the like. Particularly, the noise becomes a problem during position detection using a position sensitive device. The image blur compensation device includes an image blur compensation optical system to compensate for image blur arising due to blurring motion of an optical device, a position detection unit to detect the position of the image blur compensation optical system, an image blur compensation drive unit to drive the image blur compensation optical system based on the detection result of the position detection unit, and a power supply circuit which performs power supply to the position detection unit and the image blur compensation drive unit by a switching step-up control. The image blur compensation device includes an inhibition device to inhibit the detection operation of the position detection unit in a fixed period in which the switching phase of the power supply circuit has changed.

10 Claims, 27 Drawing Sheets

| CASE OF NO NOISE IN POSITION DETECTION CIRCUIT UNIT | CASE OF NOISE PRESENT IN POSITION DETECTION CIRCUIT UNIT |
|---|---|
| 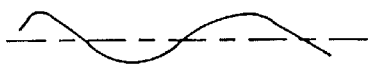 |  |
| I1 CURRENT/VOLTAGE CONVERSION OUTPUT | I1 CURRENT/VOLTAGE CONVERSION OUTPUT |
| 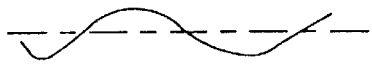 | 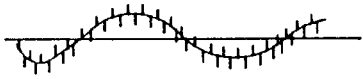 |
| I2 CURRENT/VOLTAGE CONVERSION OUTPUT | I2 CURRENT/VOLTAGE CONVERSION OUTPUT |
| 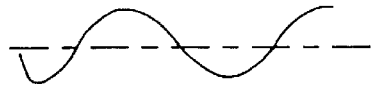 |  |
| Y AXIS IMAGE BLUR COMPENSATION LENS POSITION OUPUT | Y AXIS IMAGE BLUR COMPENSATION LENS POSITION OUPUT |

FIG. 22

CASE OF NO NOISE
IN BLURRING MOTION
DETECTION UNIT
CASE OF NOISE PRESENT
IN BLURRING MOTION
DETECTION UNIT
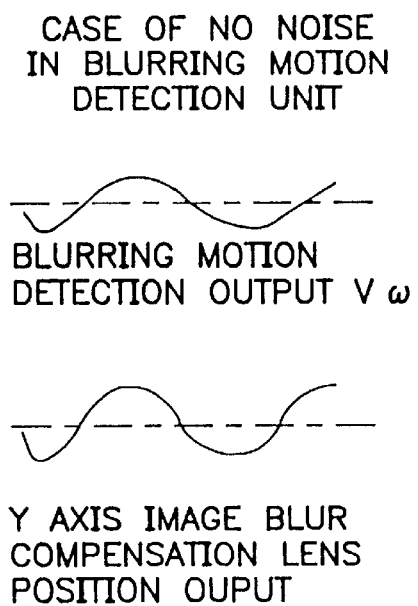
BLURRING MOTION
DETECTION OUTPUT $V\omega$
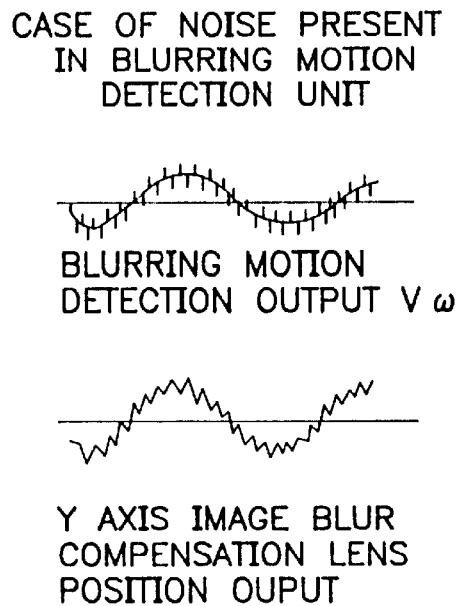
BLURRING MOTION
DETECTION OUTPUT $V\omega$
Y AXIS IMAGE BLUR
COMPENSATION LENS
POSITION OUPUT
Y AXIS IMAGE BLUR
COMPENSATION LENS
POSITION OUPUT
FIG. 23

IMAGE BLUR COMPENSATION DEVICE WITH REDUCED NOISE EFFECT MECHANISM

CROSS REFERENCE TO RELATED APPLICATIONS

This application is based upon and claims priority from Japanese Patent Application No. 07-237433 filed Sep. 14, 1995, the contents of which are incorporated herein by reference.

BACKGROUND OF THE INVENTION

1. Field of the Invention

The present invention relates to image blur compensation devices, which are used in still cameras, video cameras, and other optical devices and instruments. In particular, it relates to image blur compensation devices reducing the effects of noise which becomes a problem during position detection using a Position Sensitive Device (PSD).

2. Description of the Related Art

Image blur compensation devices, which compensate for image blur arising due to camera vibration, caused by hand motions and the like during photography, normally compensate for image blur by moving at least one lens (hereinafter termed "image blur compensation optical system") in a direction at right angles to the optical axis of the photographic lens. A general description of a prior art image blur compensation device is provided below.

FIG. 31 is a lateral cross sectional diagram showing an image blur compensation device. In FIG. 31, an image blur compensation optical system 1 is located in a lens barrel 2. Namely, the lens and the lens barrel are integral.

The lens barrel 2, as shown in FIG. 32, may be driven in the XY plane if the direction of the optical axis is the Z axis. Thus, the lens barrel 2 is driven at right angles to the Z axis in the direction of the XY plane by an electromagnetic actuator consisting of a coil 6, a magnet 7, a yoke 9, and a yoke 10.

The electromagnetic actuator constituted by the coil 6, the magnet 7, the yoke 9 and the yoke 10, consists of two sets of these elements located in mutually orthogonal directions. This structure generates respective forces in the X axis direction and the Y axis direction.

Namely, the image blur compensation optical system 1 is a structure which can move integrally with the lens barrel 2 in the X axis direction and the Y axis direction.

A slit plate 4 is located in the base edge side (yoke 9) in the sidewall of the lens barrel 2. An infrared light emitting element (IRED) 8 is located in the front end side of the lens barrel 2. The light beam of the IRED 8 is disposed to pass through a slotted hole (slit) in the slit plate 4.

Then, a position sensitive device (PSD) 5 is disposed in the yoke 9, which is fixed in position. The PSD 5, by detecting the light of the IRED 8 passing through the slit of the slit plate 4, detects the movement position of the image blur compensation optical system 1.

FIGS. 32(a)–(b) are cross sectional diagrams of the support structure of the image blur compensation optical system (lens barrel). FIG. 32(a) shows the state with the image blur compensation optical system in the optical axis position, and FIG. 32(b) shows the state with the image blur compensation optical system moved from the optical axis position.

As shown in FIGS. 32(a) and 32(b), the lens barrel 2 is cantilever supported by four elastic support members 3 (because FIGS. 32(a) and 32(b) are cross sections, only two are shown, 3a and 3b). The base end of support members 3a, 3b, are engaged with the yoke 9 and can move in a direction at right angles with respect to the optical axis.

FIG. 33 is a constitutional block diagram of a prior art image blur compensation device. In FIG. 33, the image blur compensation device is equipped with an angular velocity detection circuit (X axis) 13, an angular velocity detection circuit (Y axis) 14, a rangefinding circuit 18, a photometric circuit 19, a microcomputer unit ("CPU") 20, a main switch 26, a half depression switch 27, a release switch 28, a power supply battery 29, an optical system 51, position detection elements 56X, 56Y, a lens position detection circuit (X axis) 57X, a lens position detection circuit (Y axis) 57Y, a lens position detection circuit (AF) 58, an actuator drive circuit (X axis) 59X, an actuator drive circuit (Y axis) 59Y, a shutter drive circuit (AF) 60, actuators 61X, 61Y, a stepping motor 62, a DC/DC converter 64.

In the above constitution, the image blur compensation operation is performed as summarized next. In FIG. 33, when half depression of the release button is performed, the half depression switch 27 is set ON, the DC/DC converter 64 starts, and the CPU 20 begins to provide a stabilized power supply.

When the rangefinding circuit 18 and the photometric circuit 19 begin the standard photographic operations of the camera, at the same time the angular velocity circuit (X axis) 13 and the angular velocity circuit (Y axis) 14 begin to detect the blurring motions of the camera. The angular velocity detection sensors use piezoelectric type angular velocity sensors which detect the normal Coriolis force.

The CPU 20 integrates the outputs obtained from the angular velocity sensors (blurring motion sensors) and converts them into blurring motion angles of the camera. Furthermore, it converts the output from the angular velocity sensors into target drive position data of the image blur compensation optical system 54.

Next, when full depression of the release button is performed, the release switch 28 is set ON, and the focusing lens 55 is driven with the stepping motor 62 being controlled by the shutter drive circuit 60. Simultaneously with this operation, control is also commenced of control of the image blur compensation mechanism by the image blur compensation optical system 54.

The control of the image blur compensation mechanism is accomplished by the actuator drive circuit (X axis) 59X and the actuator drive circuit (Y axis) 59Y in order to move the image blur compensation optical system according to the same target drive position data as at the time of half depression. The actuator drive circuits 59X and 59Y perform in phase by the difference of the target drive position data and the actual image blur compensation optical system position data, and send signals to the actuators 61X and 61Y.

Detection of the actual position of the image blur compensation optical system is wholly performed by the lens position detection circuit (X axis) 57X, the lens position detection circuit (Y axis) 57Y, and the CPU 20. The usual PSD is used in the position detection elements 56X, 56Y. The CPU 20 calculates the position of the image blur compensation optical system by the output current of the PSD.

The actuator drive circuit (X axis) 59X and the actuator drive circuit (Y axis) 59Y next supply drive currents to the actuators 61X, 61Y, based on the signals of the servo units.

The actuators 61X, 61Y, based on these drive currents, move the image blur compensation optical system in a plane at right angles to the optical axis, and effect compensation of the image blur, such as due to hand motions.

However, in the prior art, in the case of detection using a PSD of the position of the image blur compensation optical system, because the photoelectric current obtained from the PSD is a very small current, there were cases in which the position data could not be accurately detected, because of the effects of noise arising inside the camera and outside the camera.

As noise sources inside the camera, there are switching noise of the DC/DC converter which is in the power supply circuit, stepping motor drive noise when driving the shutter, motor noise when driving the focusing lens(es), and the like. However, it is difficult to bring about a reduction of these noises because they stem from the characteristics and character of their devices.

Accordingly, how to reduce these noises in a image blur compensation device using a PSD in position detection of the image blur compensation optical system has become an important problem.

SUMMARY OF THE INVENTION

Accordingly, it is an object of the present invention to solve the above problems of the prior art, and to provide an image blur compensation device which can effectively reduce the effect of noise.

Objects of the present invention are achieved by an image blur compensation device comprising an image blur compensation optical system to compensate for image blur arising due to blurring motion of an optical instrument, a position detection unit to detect the position of the image blur compensation optical system, an image blur compensation drive unit to drive the image blur compensation optical system based on the detection result of the position detection unit, and a power supply circuit to perform power supply to the position detection unit and the image blur compensation drive unit by a switching step-up control, wherein the image blur compensation drive unit includes an inhibition device to inhibit the detection operation of the position detection unit, in a fixed period during which a switching phase of the power supply circuit has changed.

Further objects of the present invention are achieved by an image blur compensation device, comprising an image blur compensation optical system to compensate for image blur arising due to blurring motion of an optical instrument with a photographic lens, a position detection unit to detect a position of the image blur compensation optical system, an image blur compensation drive unit to drive the image blur compensation optical system based on the detection result of the position detection unit, and a focusing lens drive unit which drives the photographic lens to a focused position, wherein the image blur compensation drive unit includes an inhibition device to inhibit detection operation of the position detection unit, within an operation period of the focusing lens drive unit.

Still further objects of the present invention are achieved by an image blur compensation device comprising an image blur compensation optical system to compensate for image blur arising due to blurring motion of an optical instrument with a shutter, a position detection unit to detect the position of the image blur compensation optical system, an image blur compensation drive unit to drive the image blur compensation optical system, based on the detection result of the position detection unit, and a shutter drive unit to perform driving of the shutter, wherein the image blur compensation drive unit includes an inhibition device to inhibit the detection operation of the position detection unit within the operation period of the shutter drive unit.

Yet further objects of the present invention are achieved by an image blur compensation device comprising a blurring motion detection unit to detect the amount of blurring motion of an optical instrument, an image blur compensation optical system to compensate for image blur arising due to blurring motion of the optical instrument, a position detection unit to detect the position of the image blur compensation optical system, an image blur compensation drive unit to drive the image blur compensation optical system, based on an output result of the blurring motion detection unit and on an output result of the position detection unit, so as to suppress image blur, and a power supply circuit to perform power supply to the position detection unit, the blurring motion detection unit, and the image blur compensation drive unit by a switching step-up control, wherein the image blur compensation drive unit includes an inhibition device to inhibit the detection operation of the position detection unit and the blurring motion detection unit, within a fixed period after a phase of the power supply circuit has switched.

Still further objects of the present invention are achieved by an image blur compensation device comprising a blurring motion detection unit to detect the amount of blurring motion of an optical device with an optical element, an image blur compensation optical system to compensate for image blur arising due to blurring motion of the optical device, a position detection unit to detect the position of the image blur compensation optical system, an image blur compensation drive unit to drive the image blur compensation optical system, based on an output result of the blurring motion detection unit and on an output result of the position detection unit, so as to suppress image blur, a focusing lens drive unit to drive the optical element to a focused position, and a power supply circuit to perform power supply to the position detection unit, the blurring motion detection unit, and the image blur compensation drive unit by a switching step-up control, wherein the image blur compensation drive unit includes an inhibition device to inhibit a detection operation of the position detection unit and the blurring motion detection unit, within a period of operation of the focusing lens drive unit.

Even further objects of the present invention are achieved by an image blur compensation device comprising a blurring motion detection unit to detect an amount of blurring motion of an optical device with a shutter, an image blur compensation optical system to compensate for image blur arising due to blurring motion of the optical device, a position detection unit to detect the position of the image blur compensation optical system, an image blur compensation drive unit to drive the image blur compensation optical system, based on an output result of the blurring motion detection unit and on an output result of the position detection unit, so as to suppress image blur, a shutter drive unit to drive the shutter, and a power supply circuit to supply power to the position detection unit, the blurring motion detection unit, and the image blur compensation drive unit by a switching step-up control, wherein the image blur compensation drive unit includes an inhibition device to inhibit the detection operation of the position detection unit and the blurring motion detection unit, within a period of operation of the shutter drive unit.

Other objects of the present invention are achieved by an image blur compensation device wherein the image blur compensation drive unit includes a cancellation device to cancel the inhibition of the detecting by the detection unit in cases in which a state of a driving operation by the shutter drive unit during shutter opening does not change in a predetermined time.

Still further objects of the present invention are achieved by an image blur compensation device, comprising a blurring motion detection unit to detect an amount of blurring motion of an optical device using film, an image blur compensation optical system to compensate for image blur arising due to blurring motion of the optical device, a position detection unit to detect a position of the image blur compensation optical system, an image blur compensation drive unit to drive the image blur compensation optical system based on an output result of the blurring motion detection unit and on an output result of the position detection unit, so as to suppress image blur, a shutter exposure control unit to control exposure of film in the optical device, and a power supply circuit to perform power supply to the position detection unit, the blurring motion detection unit, the shutter exposure control unit, and the image blur compensation drive unit by a switching step-up control, wherein the image blur compensation drive unit includes an inhibition device to inhibit a switching control operation of the power supply circuit within a period of operation of the shutter exposure control unit.

Yet further objects of the present invention are achieved by an image blur compensation device comprising a blurring motion detection unit to detect an amount of blurring motion of an optical device with a shutter, an image blur compensation optical system to compensate for image blur arising due to blurring motion of the optical device, a position detection unit to detect a position of the image blur compensation optical system, an image blur compensation drive unit to drive the image blur compensation optical system based on an output result of the blurring motion detection unit and on an output result of the position detection unit, so as to suppress image blur, a shutter drive unit to drive the shutter, and a power supply circuit to perform power supply to the position detection unit, the blurring motion detection unit, the shutter drive unit, and the image blur compensation drive unit by a switching step-up control, wherein the image blur compensation drive unit includes an inhibition device to inhibit a switching control operation of the power supply circuit within a period of operation of a drive control of the image blur compensation optical system.

Moreover, further objects of the present invention are achieved by an image blur compensation device wherein the power supply circuit has at least one capacitor for backup use.

BRIEF DESCRIPTION OF THE DRAWINGS

These and other objects, features, and characteristics of the present invention will become apparent to one skilled in the art from a study of the following detailed description, the appended claims and drawings, all of which form a part of this specification. In the drawings:

FIG. 22 is a position output waveform diagram of an image blur compensation optical system according to an embodiment of the present invention;

FIG. 23 is an output waveform diagram of a blurring motion detection circuit according to an embodiment of the present invention;

FIG. 32(a) is a diagram showing a state in the optical axis position, and FIG. 32(b) is a diagram showing a state where the image blur compensation mechanism has moved from the optical axis position;

DETAILED DESCRIPTION OF THE PREFERRED EMBODIMENTS

The operation is described below of the image blur compensation device according to the preferred embodiments of the present invention with reference to the attached figures.

Figure 1:
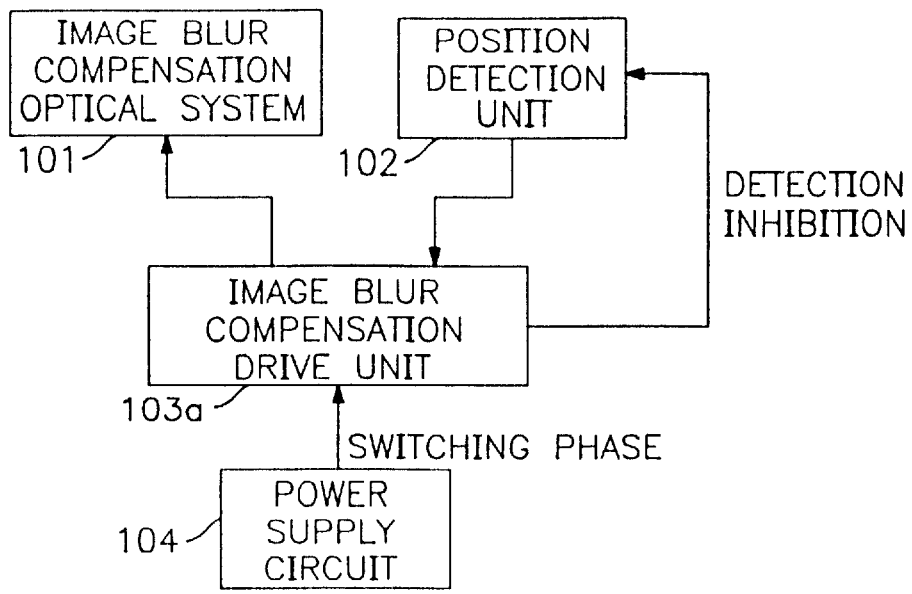
FIG. 1 is a block diagram of a first preferred embodiment of the present invention.

According to the first preferred embodiment of the present invention as depicted in FIG. 1, an image blur compensation drive unit 103a inhibits the detection operation of a position detection unit 102 during a fixed period during which the switching phase of a power supply circuit 104 has changed.

Figure 2:
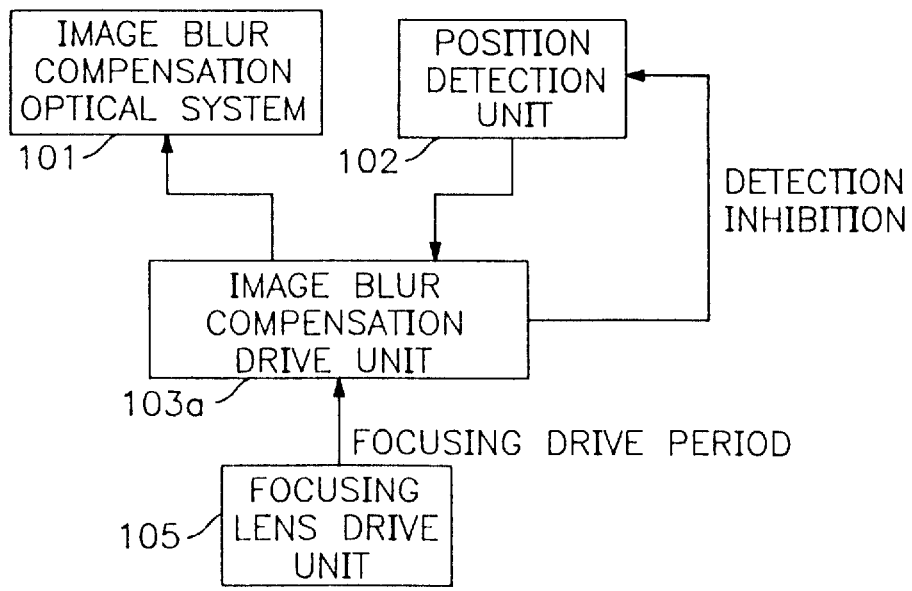
FIG. 2 is a block diagram of a second preferred embodiment of the present invention.

According to the second preferred embodiment of the present invention as shown in FIG. 2, the image blur compensation drive unit 103a inhibits the detection operation of the position detection unit 102 during a movement period of a focusing lens drive unit 105.

Figure 3:
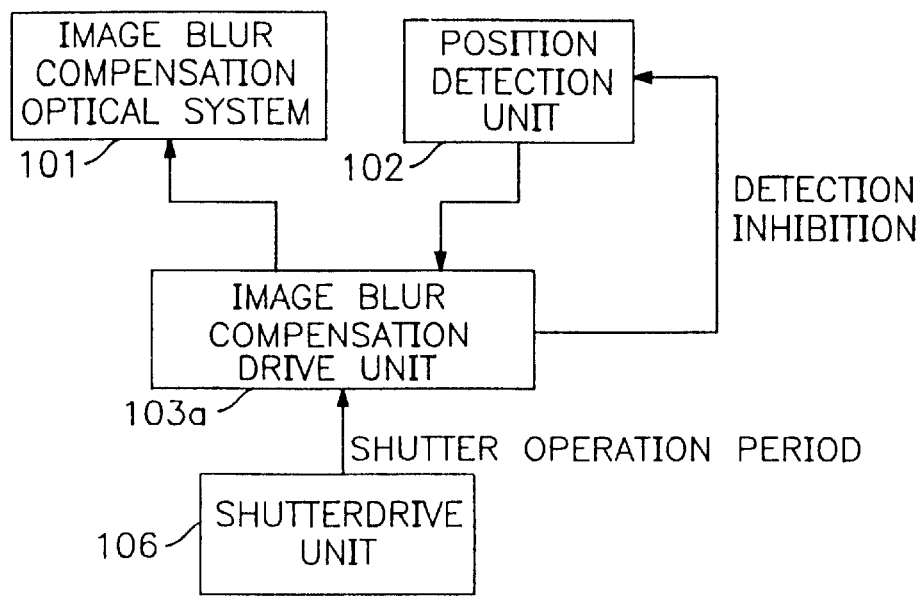
FIG. 3 is a block diagram of a third preferred embodiment of the present invention.

According to the third preferred embodiment of the present invention as shown in FIG. 3, the image blur compensation drive unit 103a inhibits the detection operation of the position detection unit 102 during a movement period of a shutter drive unit 106.

Figure 4:
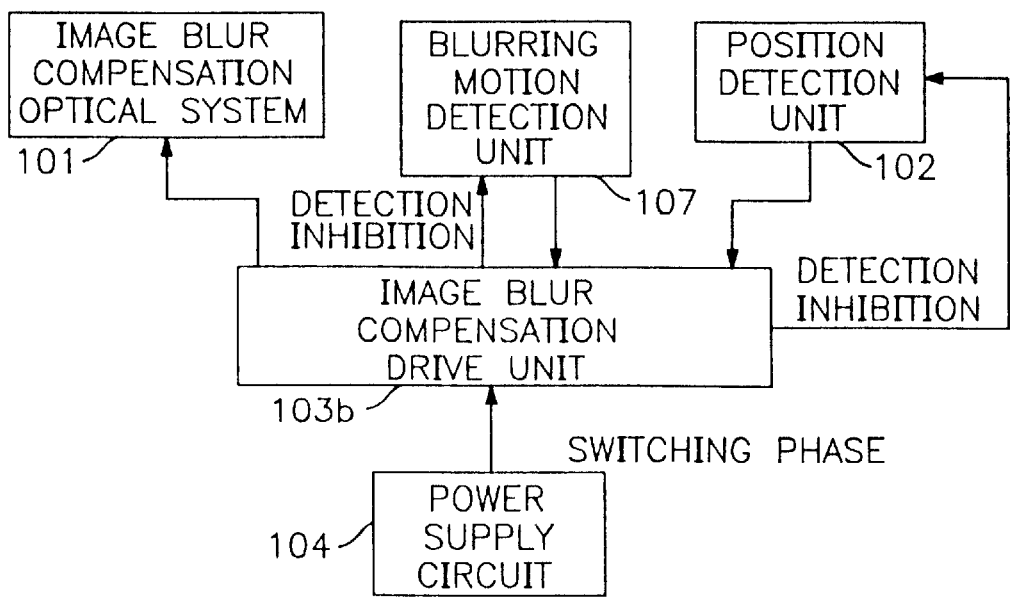
FIG. 4 is a block diagram of a fourth preferred embodiment of the present invention.

According to the fourth preferred embodiment of the present invention as shown in FIG. 4, an image blur compensation drive unit 103b inhibits the detection operation of a blurring motion detection unit 107 and the position detection unit 102, within a fixed period during which the switching phase of the power supply circuit 107 has changed.

Figure 5:
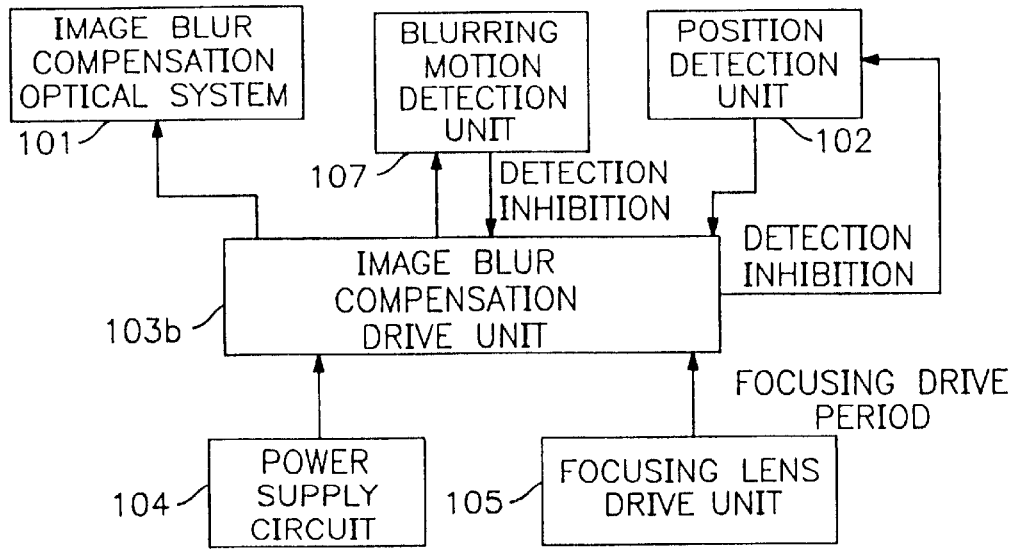
FIG. 5 is a block diagram of a fifth preferred embodiment of the present invention.

According to the fifth preferred embodiment of the present invention as shown in FIG. 5, the image blur compensation drive unit 103b respectively inhibits the detection operation of the blurring motion detection unit 107 and the position detection unit 102 within the period of operation of the focusing lens drive unit 105.

Figure 6:
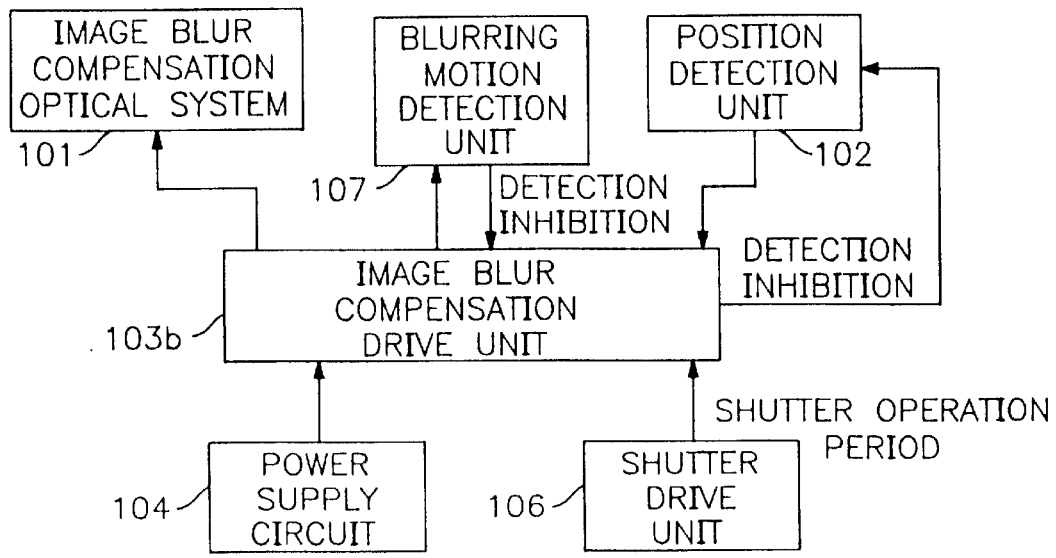
FIG. 6 is a block diagram of a sixth preferred embodiment of the present invention.

According to the sixth preferred embodiment of the present invention as illustrated in FIG. 6, the image blur compensation drive unit 103b respectively inhibits the detection operation of the blurring motion detection unit 107 and of the position detection unit 102 within the period of operation of the shutter drive unit 106.

Figure 7:
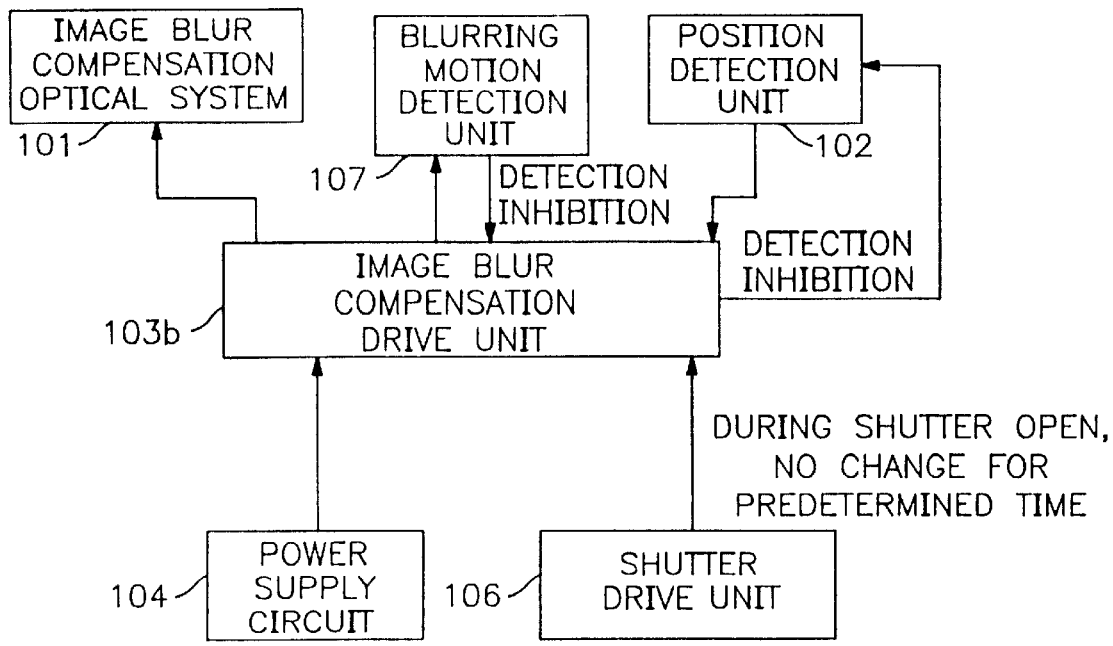
FIG. 7 is a block diagram of a seventh preferred embodiment of the present invention.

According to the seventh preferred embodiment of the present invention as illustrated in FIG. 7, the image blur compensation drive unit 103b respectively inhibits the detection operation of the blurring motion detection unit 107 and of the position detection unit 102 within the period of operation of the shutter drive unit 106.

Figure 8:
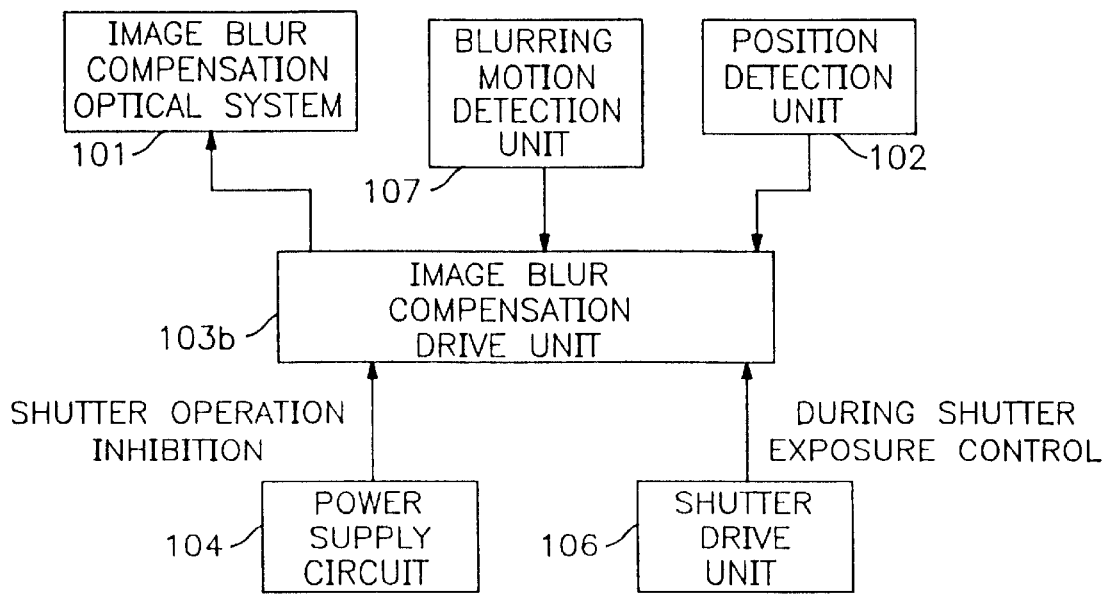
FIG. 8 is a block diagram of an eighth preferred embodiment of the present invention.
Figure 9:
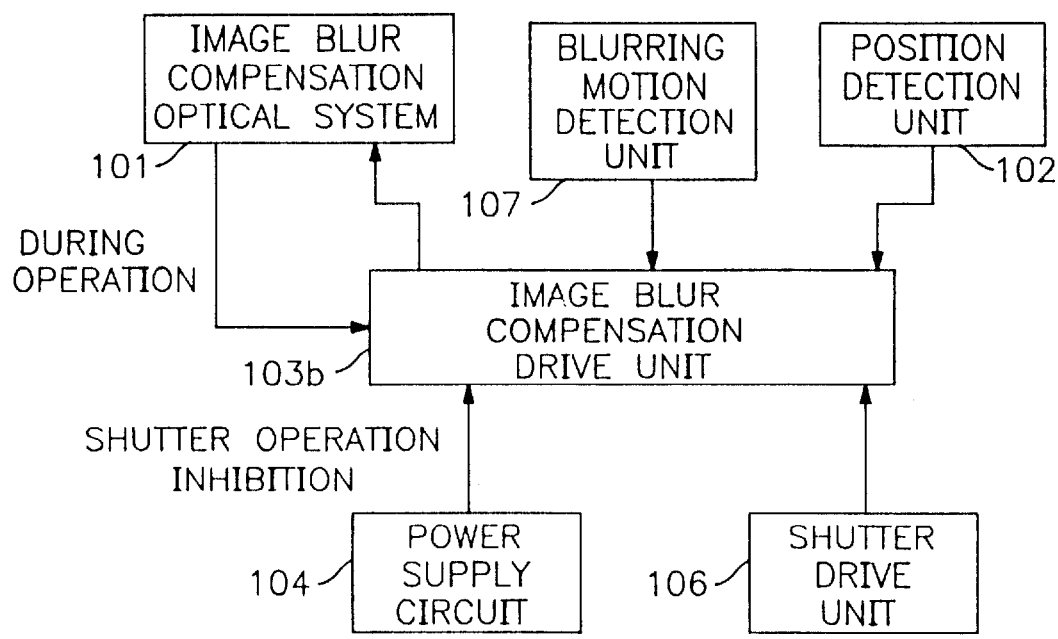
FIG. 9 is a block diagram of a ninth preferred embodiment of the present invention.

According to the eighth embodiment of the present invention as shown in FIG. 8, the image blur compensation drive unit 103b inhibits the switching operation of the power supply circuit 104 during the period of operation of shutter exposure control.

According to the ninth embodiment of the present invention, the image blur compensation drive unit 103b inhibits the switching operation of the power supply circuit 104 within the period of operation of the drive control of a image blur compensation optical system 101. During this operation, a capacitor for backup use acts as a substitute for the power supply circuit 104, making image blur detection possible.

In the above manner, in the preferred embodiments of the present invention, during execution of the operation of detection of the blurring motion amount of the camera and of position detection of the image blur compensation optical system, operation is inhibited at the time of noise generation. Because the inhibition is cancelled in the case where it is considered that there is no effect from noise, noise which is inevitably generated can be avoided, and the effect of noise can be effectively reduced.

The first through ninth embodiments according to the present invention are described below with reference to the accompanying drawings.

Figure 10:
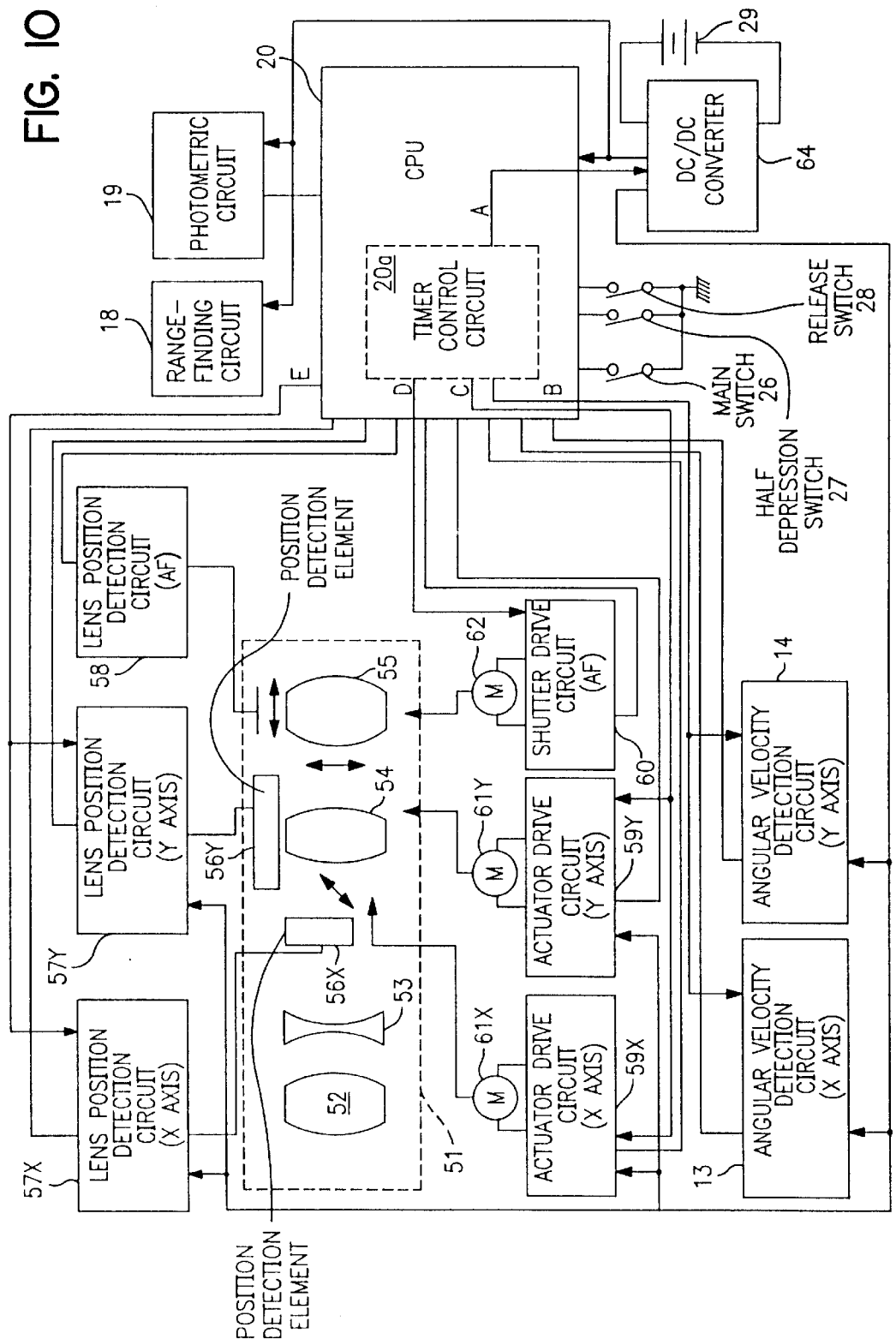
FIG. 10 is a block diagram of an image blur compensation device according to the first embodiment of the present invention.
Figure 33:
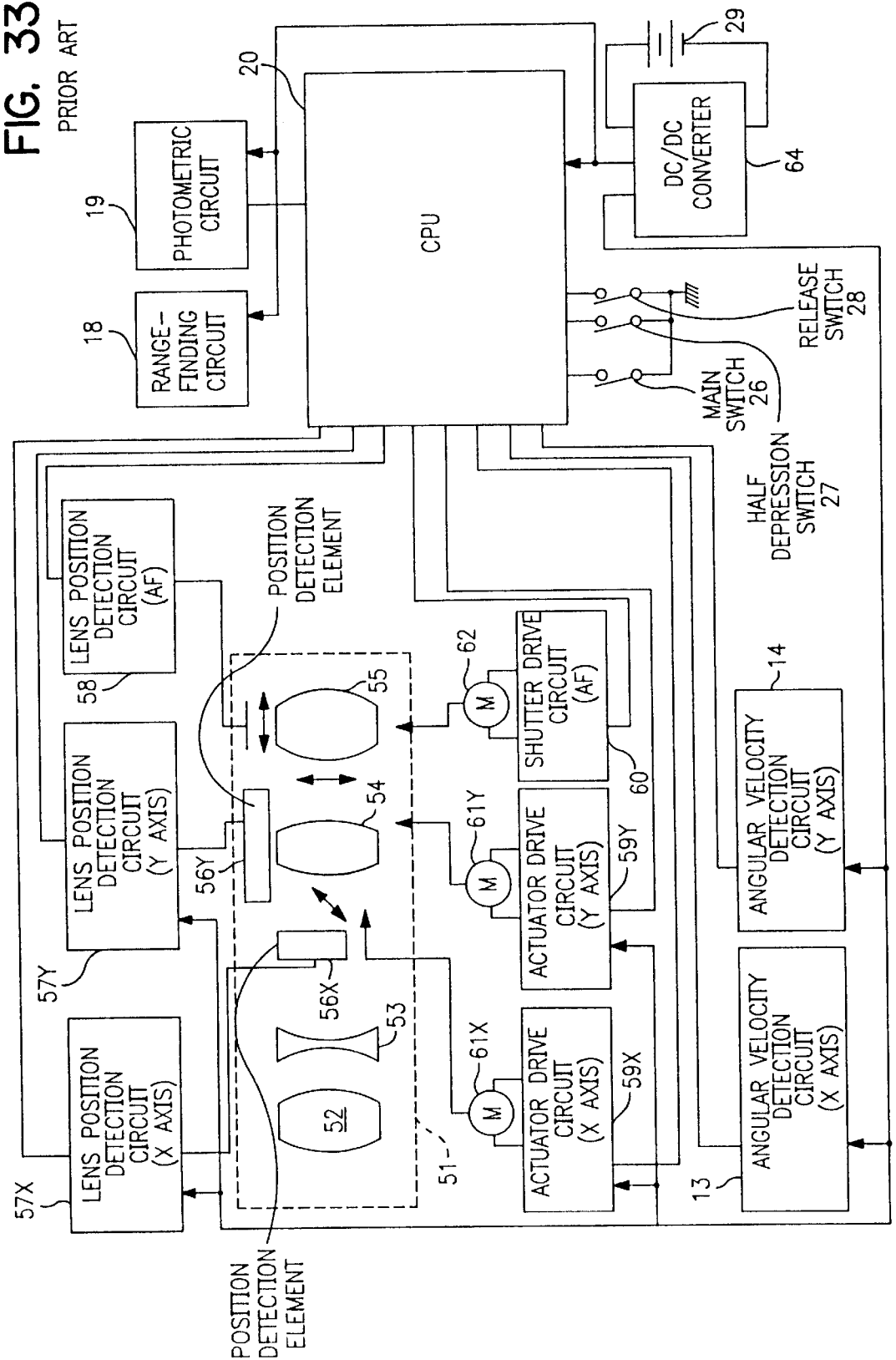
FIG. 33 is a constitutional block diagram of a prior art image blur compensation device.

FIG. 10 is a constitutional block diagram of an image blur compensation device according to a first embodiment of the present invention. Moreover, each of the following embodiments is similar, and constitutional portions which are the same as the prior art (FIG. 33) are given the same reference symbols.

In the first embodiment, a timer control circuit 20a is provided in the CPU 20. This timer control circuit 20a counts a fixed time from the switching change of the DC/DC converter 64. After timing out, the sampling is performed of the blurring motion detection circuit of the image blur compensation mechanism and the position detection circuit of the image blur compensation optical system.

Namely, a switching signal control signal A to the DC/DC converter 64, a control signal D to the shutter drive circuit 60, a control signal C to the actuator drive circuits 59X, 59Y, a control signal E to the position detection circuit of the image blur compensation optical system, and a control signal B to the image blur detection circuit are respectively output from the timer control circuit 20a in the CPU 20. As described below, various control timing is performed (see FIG. 21) to reduce the effects of noise.

The image blur compensation device according to the first embodiment of the present invention is described below. The system for compensating image blurring motion of the camera detects the angular velocity arising due to hand movements as components in two directions (yaw direction, pitch direction) orthogonal to the photographic optical axis of the camera. The system changes the optical axis of a portion of the photographic optical system (termed below, "blur compensation optical system") by causing shifts, independently in the abovementioned two directions, according to the detected angular velocity components. The system is one which compensates for blurring, due to hand movements, of the image on the film surface.

Detecting the amount of blurring motion of the camera is performed by (1) a blurring motion detection unit which detects blurring motion of the camera, (2) a position detection unit which detects the movement position of the image blur compensation optical system, (3) a blurring motion amount calculating unit which calculates the amount of blurring motion, and (4) a drive unit of the image blur compensation optical system.

First, the blurring motion detection unit and the blurring motion amount calculating unit will be described.

Figure 11:
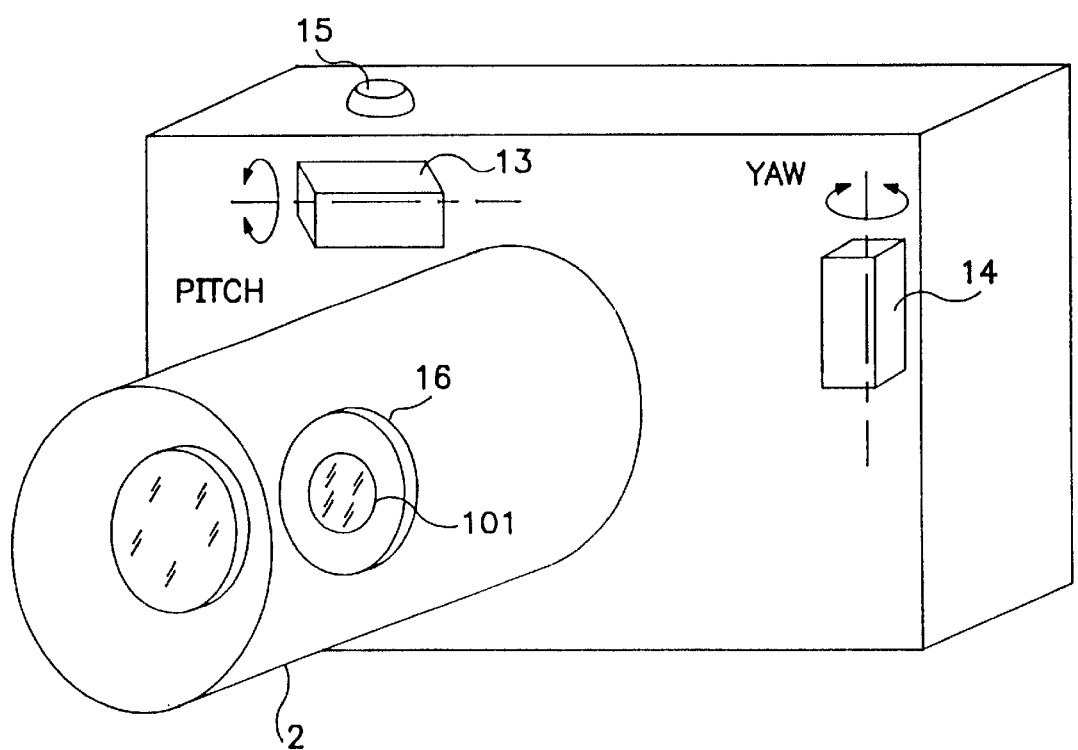
FIG. 11 is a positional relationship diagram of an image blur compensation mechanism and a position detection element according to an embodiment of the present invention.

FIG. 11 is a positional relationship diagram of the image blur compensation mechanism and the position detection element. As shown in FIG. 11, the detection elements 13, 14 which detect the blurring motion angular velocity components of the camera are positioned on mutually orthogonal axes, both of which are perpendicular to the optical axis.

In the lens barrel 2, the image blur compensation optical system 101 can move independently in two orthogonal directions which are the image blur compensation directions. Moreover, release button 15 is used to perform camera photography.

Figure 12:
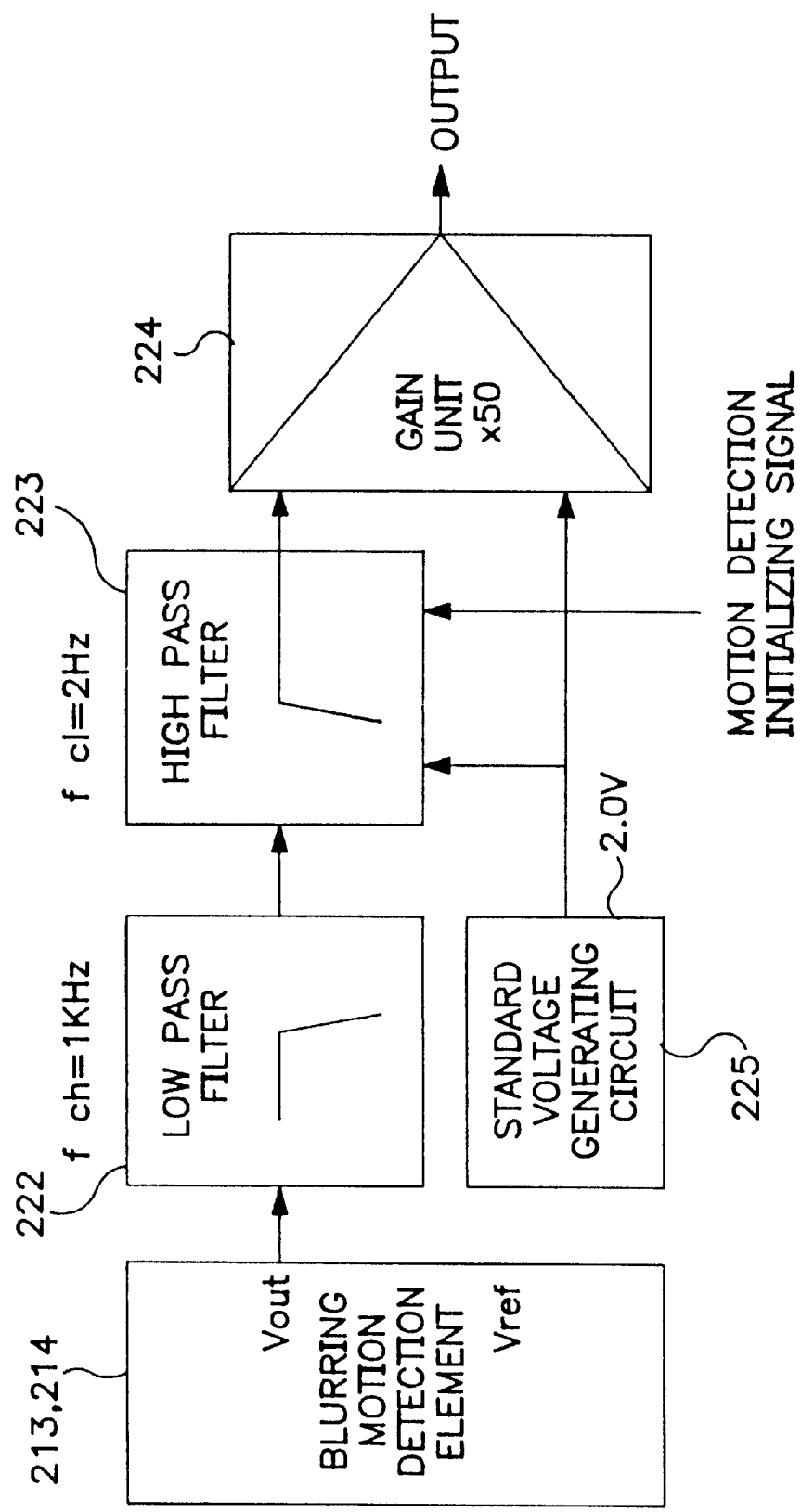
FIG. 12 is a constitutional block diagram of a blurring motion detection circuit according to an embodiment of the present invention.

Next, FIG. 12 is a block diagram showing the constitution of the blurring motion detection circuit. In FIG. 12, this blurring motion detection circuit is equipped with blurring motion detection elements 213, 214, LP filter (low pass filter) 222, HP filter (high pass filter) 223, gain unit 224, and standard voltage generating circuit 225.

The blurring motion detection elements 213, 214 are angular velocity sensors which detect the angular velocity arising in the camera, for example, by the principle of causing an electrical signal to arise in a piezoelectric element, as a result of the Coriolis force which occurs due to the rotation of a vibration gyro.

The LP filter 222 is a high frequency cut-off filter in order to remove high frequency noise from the output of the blurring motion detection elements 213, 214, in order to get rid of the effects of resonant frequencies of the blurring motion detection elements themselves.

The HP filter 223 has as its main object the elimination of low frequency drift components perpendicular to the blurring motion detection elements 213, 214. A blurring motion detection initializing signal is input to the HP filter 223 from the exterior.

This blurring motion detection initializing signal is a signal which initializes the output of the blurring motion detection circuit, controlling the switching ON and OFF of an analog switch (not shown in the drawing) disposed in the output side terminal of a capacitor which constitutes the HP filter 223.

The CPU 20 controls the control timing of this analog switch, using the stored time data based on the rise characteristics of the blurring motion detection elements 213, 214.

The gain unit 224 is constituted by a voltage amplifier which outputs the output of the HP filter 223, with a predetermined gain, to the CPU 20.

The standard voltage generating circuit 225 is a circuit which forms a standard voltage in order to operate each of the blurring motion detection circuits 213, 214, and is constituted by the suppression of voltage changes by independent DC/DC converters and the like.

Figure 13:
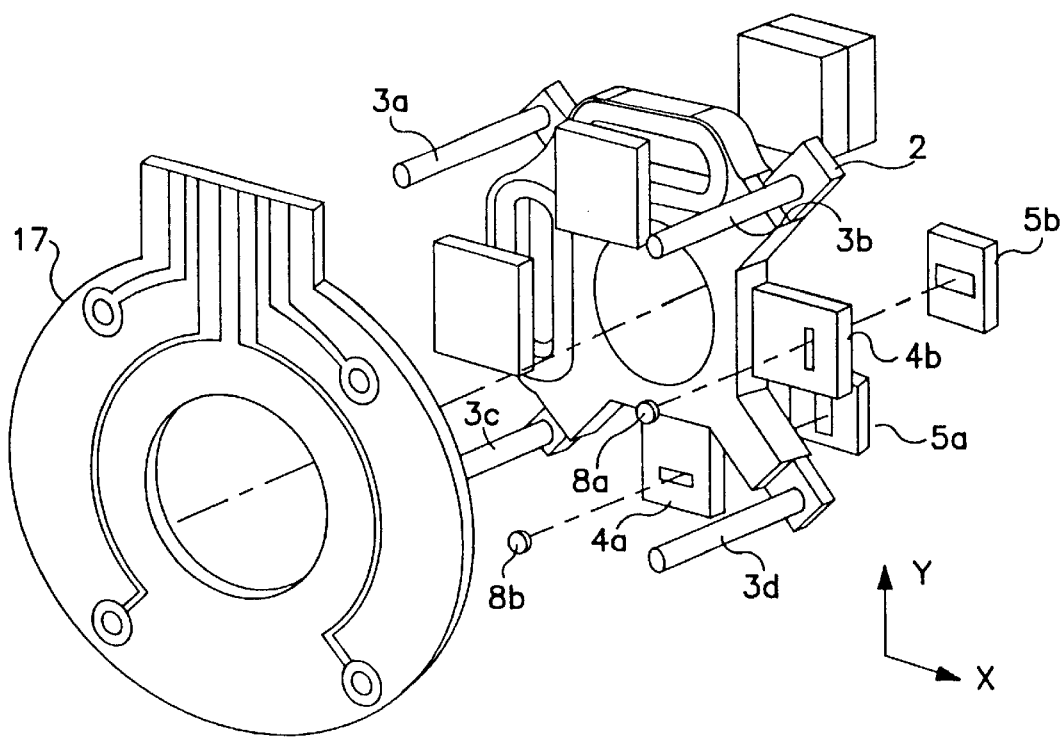
FIG. 13 is an exploded oblique diagram of an image blur compensation mechanism according to an embodiment of the present invention.

FIG. 13 is an exploded oblique diagram of the image blur compensation mechanism. In FIG. 13, the motion of the image blur compensation optical system is monitored by optical position detection elements 5a, 5b, separately located in the X-axis direction and the Y-axis direction.

As aforementioned, a PSD is used in the optical position detection elements. The total length of the PSD detection unit, is determined by the positional relationship of the IRED (infrared emitting LED) mentioned below and the slit, and the slit width and the moveable range of a check lens.

Slit plates 4a, 4b, of low surface reflectivity suppressed by the material, are mounted in the lens barrel 2. A slotted hole with respect to the Y-axis direction is opened in the X-axis direction slit plate 4a.

IREDs 8a and 8b, which are infrared emitting elements, are mounted on a printed circuit board 17 of annular shape.

The method of supporting the image blur compensation mechanism, that is, the method of supporting the lens barrel, will next be described. The lens barrel 2 is supported in a cantilevered manner by elastic support members 3 (3a, 3b, 3c, 3d) of high electrical conductivity.

As the elastic body support members, other than elastic members of beryllium copper, phosphor bronze, and the like copper alloys, metal plated and the like high electrical conductivity surface treated materials may be used. One end of each of the elastic support members is inserted into the lens barrel 2. The other end of each support member is fixed by soldering to the annular printed circuit board 17.

Drive range limiting members (not shown in the drawing) are disposed in the peripheral portion of the lens barrel 2. These drive range limiting members include structures which limit the motion of the image blur compensation optical system in positions close to the coils which drive the optical system. The structure is one which limits the generation of moments while touching the limiting members. Because of this, there is no risk of adverse effects exerted on the elastic support members which support the image blur compensation optical system.

Figure 14:
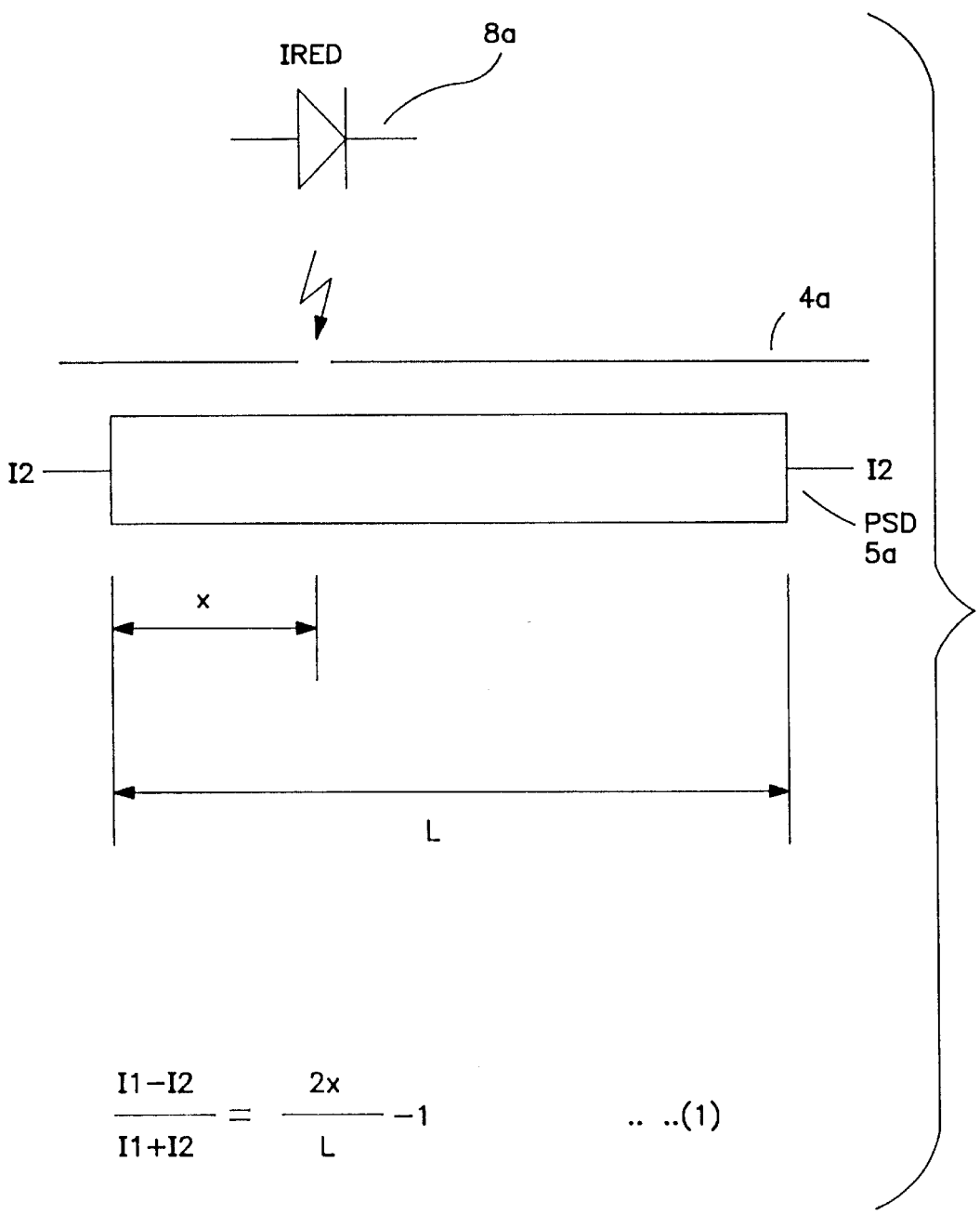
FIG. 14 is an illustrative diagram of the position detection operation of an image blur compensation mechanism according to an embodiment of the present invention.

FIG. 14 is an illustrative diagram of the operation of detecting the position of the image blur compensation optical system. In FIG. 14, the emitted light of the infrared light emitting element IRED 8a passes through the slit of the slit plate 4a which has been mounted in the lens barrel 2 and is incident on the one-dimensional PSD 5a for use in position detection.

The movement of the slit plate 4a which has been mounted in the lens barrel 2, namely, by movement of the image blur compensation optical system 101 in the Y direction, the incident position of a light spot which has passed through the slit, moves on the light receiving surface of the one-dimensional PSD 5a. By a well-known PSD principle, the value of the current (I1, I2) flowing from both terminals changes according to the position of incidence of the light spot.

The relationship between the slit light position x, the length L of PSD 5a, and currents I1 and I2 is:

$$\frac{I1 - I2}{I1 + I2} = \frac{2x}{L} - 1 \qquad \text{Equation 1}$$

Figure 15:
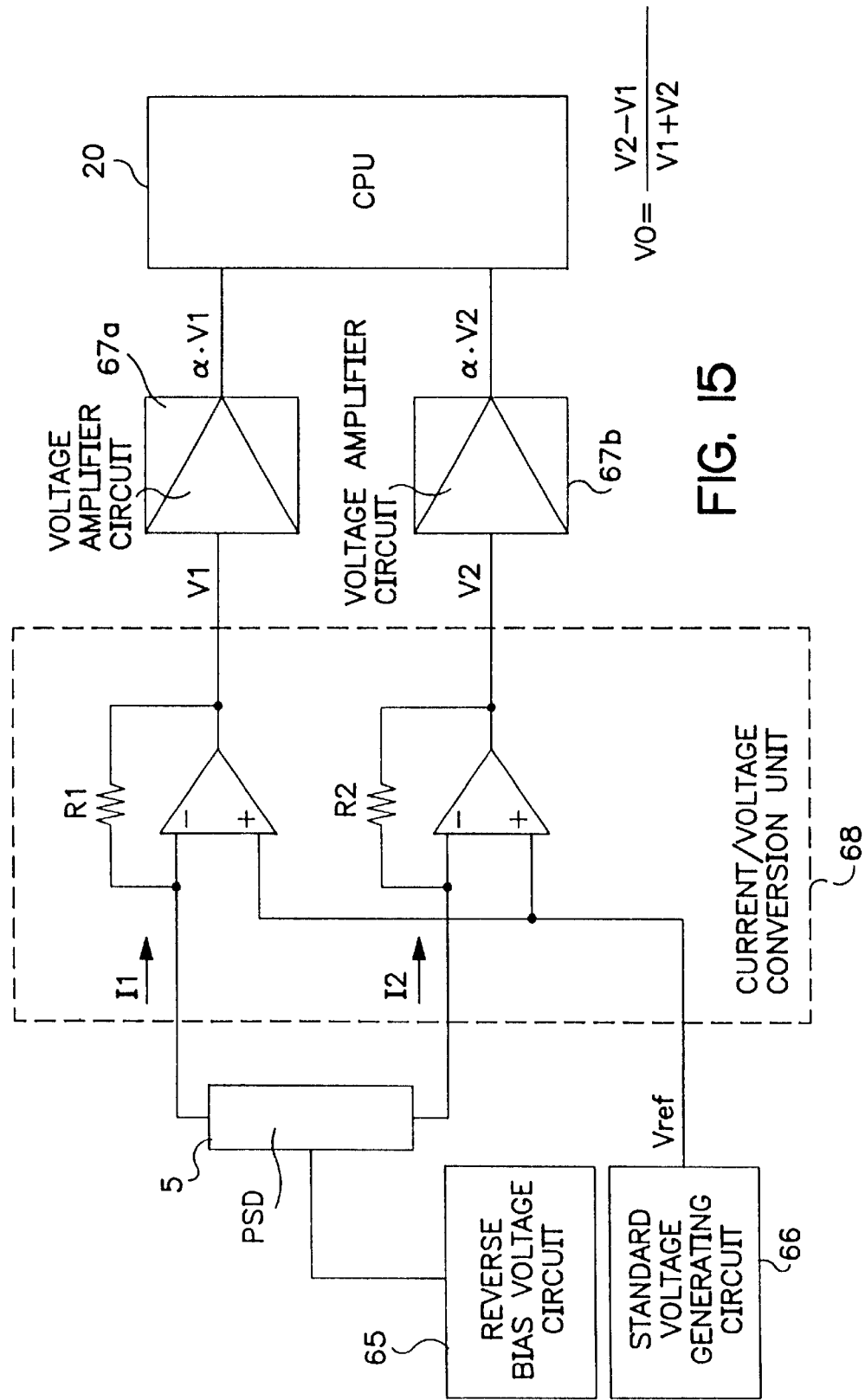
FIG. 15 is a constitutional block diagram of a position calculating circuit of an image blur compensation mechanism according to an embodiment of the present invention.

FIG. 15 is a constitutional block diagram of the position calculating circuit of the image blur compensation mechanism. By using the output currents of the one-dimensional PSD in this circuit, the position of the light spot incident from the slit of the slit plate is calculated.

Figure 16:
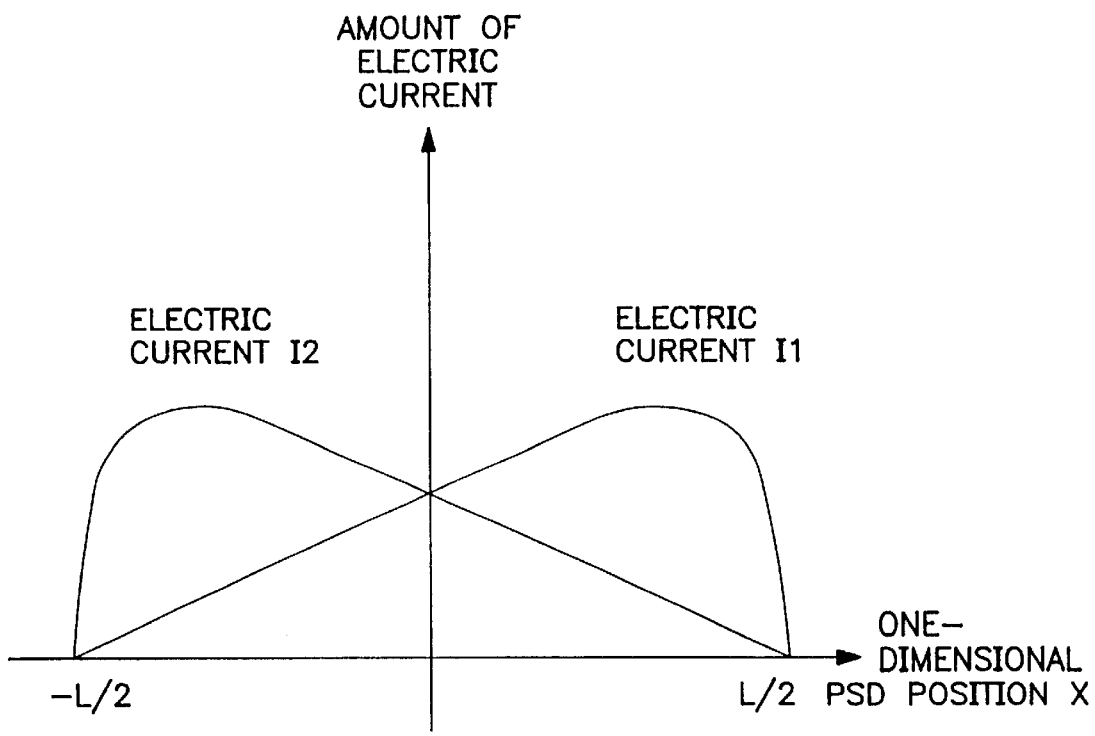
FIG. 16 is a relational diagram of the slit position of a one-dimensional PSD and the output current according to an embodiment of the present invention.

In the PSD, a reverse bias voltage is supplied from a reverse bias voltage circuit 65, branching to photocurrents I1, I2 determined by the slit position and flowing out from PSD 5. In this case, the current increases when the slit is closer with respect to the takeoff electrode. This situation is shown in FIG. 16, which is a diagram showing the relationship of the slit position on the one-dimensional PSD to the output current.

The photocurrents I1 and I2 are converted into voltages by the current to voltage conversion unit 68 shown in FIG. 15, becoming output voltages V1 and V2 of, respectively, R1×I1 and R2×I2, and are furthermore amplified in voltage amplifier circuits 67a, 67b, respectively to α times V1 or α times V2.

The outputs of the voltage amplifiers 67a, 67b are input to a calculator, namely the A/D converter input terminals of the CPU 20. The CPU 20 finds the incidence position X based on Equation 1 above.

Moreover, as shown in FIG. 15, V0 is found from V1 and V2, and a voltage V0, denoting a position signal X of the light incident from the slit onto the 1-dimensional PSD, can be output. V0 is found using equation 2 below.

$$V0 = \frac{V2 - V1}{V1 + V2} \quad \text{Equation 2}$$

The outputs from voltage amplifier circuits 67a, 67b are input to the A/D conversion port of the microcomputer. The method of obtaining an output corresponding to the position of x, is a process in which the CPU 20 is not used for complex calculations.

For example, if the voltage $\alpha \cdot V1 + \alpha \cdot V2$ is such as to become 1 (V) with respect to a potential of a standard voltage VREF, using any control such as varying the gain of the voltage amplifier circuits, or causing the photocurrent of the IRED to change, $\alpha \cdot V2 - \alpha \cdot V1$ is output.

When the slit is at the I1 side electrode end of PSD 5, in theory at first some value of photocurrent flows in the I1 side terminal, and no photocurrent flows on the I2 side.

Consequently, establishing the following conditions, a voltage V0 shows the position x, and outputs $-1$ (V) with respect to the standard voltage VREF.

$$\alpha \cdot V1 + \alpha \cdot V2 = 1(V) \quad (3)$$

$$V2 = 0 \quad (4)$$

$$V0 = \{(\alpha \cdot V2 - \alpha \cdot V1)/(\alpha \cdot V1 + \alpha \cdot V2)\} = -1 \quad (5)$$

On the other hand, when the slit is at the I2 side electrode end, V1=0 (V), and the voltage V0 showing the position x becomes +1 (V).

$$\alpha \cdot V1 + \alpha \cdot V2 = 1(V) \quad (6)$$

$$V1 = 0 \quad (7)$$

$$V0 = \{(\alpha \cdot V2 - \alpha \cdot V1)/(\alpha \cdot V1 + \alpha \cdot V2)\} = +1(V) \quad (8)$$

Figure 17:
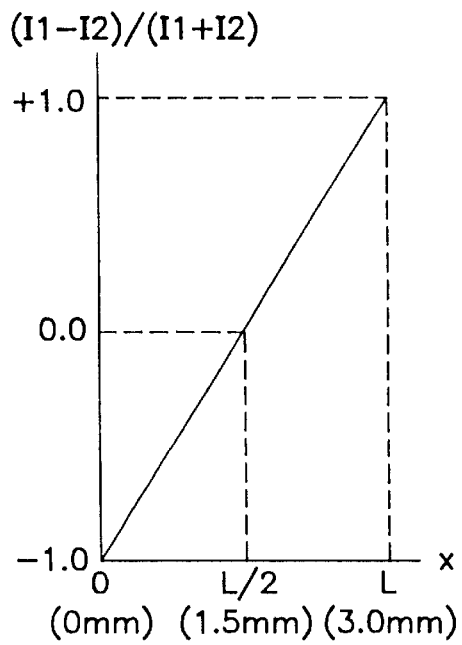
FIG. 17 is a relational diagram of the incidence position of a position detection unit and the output voltage according to an embodiment of the present invention.

FIG. 17 is a diagram of the relation of the incident position of the position detection unit and the output voltage. In FIG. 17, the abscissa shows the incident position of the light striking the PSD, and the ordinate denotes the output voltage V0 corresponding to the incident position x on the PSD.

As can be seen from FIG. 14, the position of the slit light on the light receiving surface of the PSD and the voltage value is a proportional relationship. Thus, by monitoring the output voltage value from the calculating unit, the position of the slit, namely, the position of the image blur compensation optical system, can be determined.

The calculating unit which calculates the appropriate compensation amount of the blurring motion compensation lens by integrating calculations resulting from the angular velocity will next be described.

Figure 18:
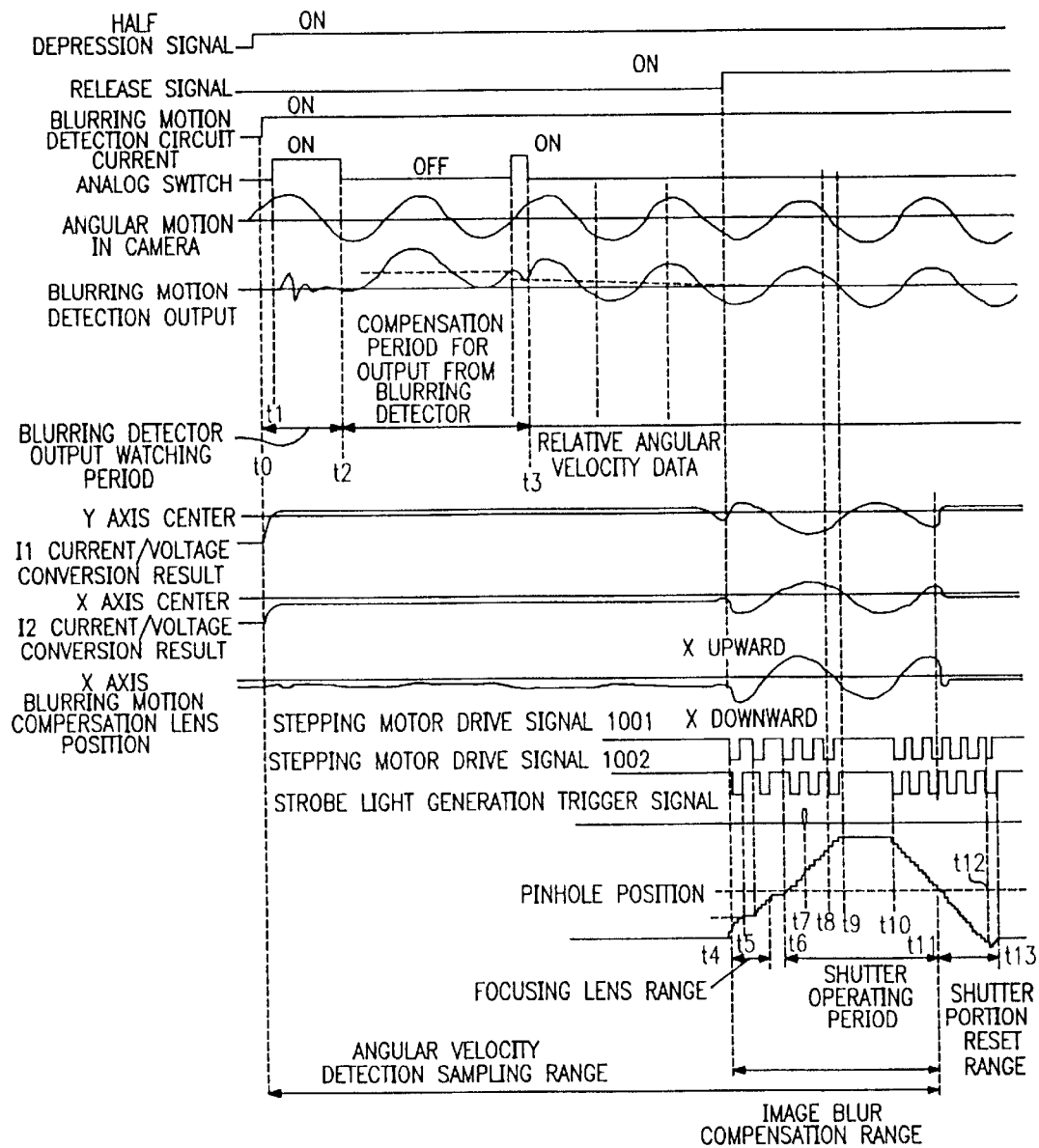
FIG. 18 is an operational time chart of an image blur compensation control unit according to an embodiment of the present invention.

FIG. 18 is an operation time chart of the image blur compensation control unit. This time chart shows the relationship, in the case that a sinusoidal vibration has arisen in the camera, between the output of the blurring motion detection circuit and the output of the position detection circuit of the image blur compensation optical system.

In FIG. 18, a waveform in the Y direction is shown, in a direction which is perpendicular with respect to the camera. A description of the X direction is omitted, but the control is completely the same. At t0, the operation is performed by half depression of the release button, which sets the half depression switch 27 ON and simultaneously the step-up switching operation of the DC/DC converter 64 commences, and a power supply to the blurring motion detection circuit is established. Directly after it is established, many noise components are included in the output of the blurring motion detection elements, and it takes time to stabilize.

In the case that detection of angular velocity zero is performed in this timing, a disturbed output is detected because of the instability. Because the angular velocity zero as a standard cannot be accurately detected, by the blurring motion detection output initialization control signal which is output from the CPU 20, the analog switch of the blurring motion detection circuit is set ON for a predetermined time, the angular velocity output is compulsorily set, and suppresses a large oscillating output of the amplifier circuits.

The time when the analog switch is ON after the power supply of the blurring motion detection elements is On is less than 50 ms; such that the release time lag does not become long. At t2 and thereafter, the blurring motion detection circuit is caused to operate, and an output is obtained.

However, the output of the blurring motion detection unit, in this circuit constitution, whatever the angular velocity, the angular velocity sensor, or the voltage determined by the circuit conditions of the blurring motion detection unit, a predetermined voltage is output as the initial voltage, and it is difficult to accurately perform a detection of angular velocity zero.

A detailed description is omitted here, but the CPU 20 performs an analysis of the angular velocity output waveform. When the angular velocity is zero at a predicted timing t3, the analog switch of the blurring motion detection circuit is set ON, the angular velocity output is corrected such that it becomes zero.

The output at this timing, by using the standard position of the angular velocity output, the output of the vibration gyro is amplified. This output is input to the A/D converter port of the CPU 20, and the integration calculation of the angular velocity is performed.

In this manner, such as that at the timing of the approximate zero angular velocity, the output of the blurring motion detection unit becomes a predetermined voltage, is rectified to a U amplitude, and accurate compensation is possible from the time of commencement of the image blur compensation control.

Here, the integral calculation, in this mode of embodiment, is a digital calculation by the CPU 20. The CPU integrates the calculated angular velocity $\omega$, and calculates the blurring motion angle $\theta_c$. The blurring motion angular velocity $\omega$, in theory, is converted by means of Equation (9) to the blurring motion angle $\theta_c$ (units: °)

$$\omega_c = \int \omega dt = \Sigma \omega \quad (9)$$

The CPU 20 periodically reiterates the calculation of the image blur amount by the blurring motion angle $\omega_c$ which is found, and awaits operation by full depression of the release button.

Next, a description will be given of the input voltages of the actuator drive circuits 59X, 59Y and the voltage which is impressed on the voice coil (VCM). The voltage which is impressed on the voice coil (VCM) is proportional to the difference of the output Vout from the CPU 20 and the internal standard voltage Vref (=2.0 V).

For example, in the case of the drive voltage of the Y-axis voice coil, when the voltage to the drive unit from the CPU 20 is higher than the standard voltage, a current flows which drives the image blur compensation optical system in the direction towards the top side. On the other hand, when a voltage lower than the standard voltage is applied, the current flowing in the drive circuit becomes the reverse of the former current.

There is an approximately proportional relationship between the value of the drive voltage and the current which flows in the voice coil. Consequently, the image blur compensation optical system also moves a drive amount which was made proportional to the current which flows in the voice coil. This situation is shown in FIG. 19, a drive characteristic diagram of the image blur compensation optical system.

Figure 19:
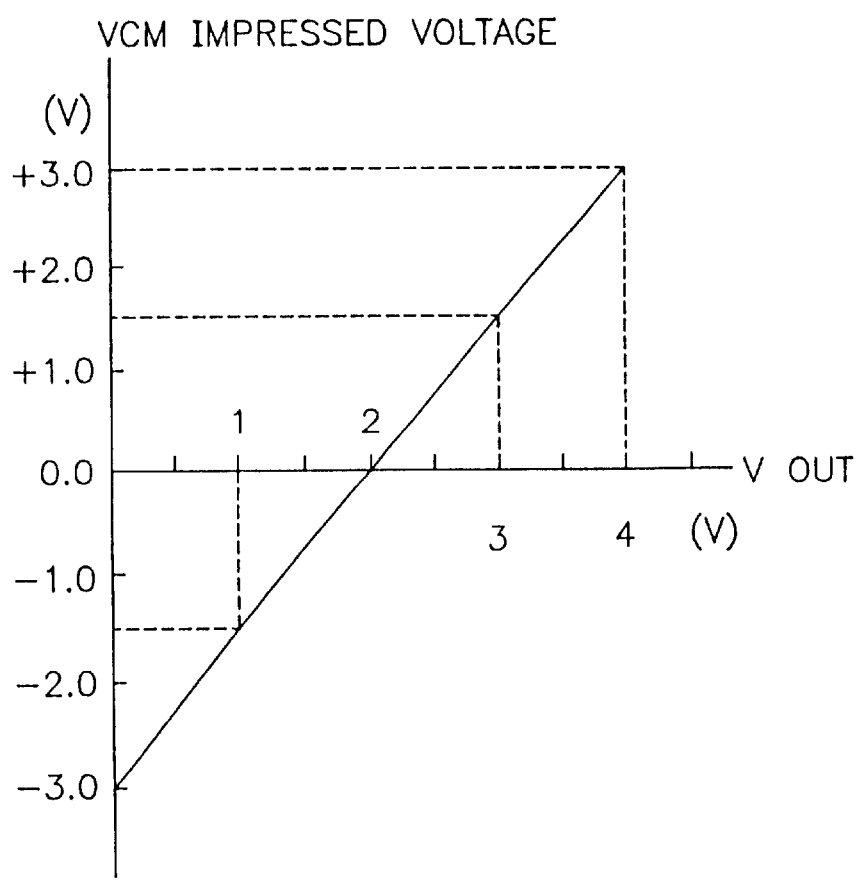
FIG. 19 is a drive characteristic diagram of an image blur compensation optical system according to an embodiment of the present invention.

The abscissa of FIG. 19 is the voltage applied from the CPU 20 to the drive unit, and is the voltage applied to the drive coil. That is, the input voltage of the abscissa making the standard voltage of 2 (V) a boundary, reverses the polarity of the impressed voltage of the ordinate, and the current flowing to the coil current becomes reversed. In this manner, the mechanism is disposed independently in the X-axis and the Y-axis.

Next, at the timing t4 shown in FIG. 18, when the release button is deeply depressed, the release switch 28 is set ON, and photographic operations proceed. The image blur compensation mechanism, between this point in time up to the end at t11, performs control of the image blur compensation optical system.

As the timing which does image blur compensation control of the image blur compensation optical system has to be at least carried out during the opening of the shutter, from t6 up to t11.

This control of the CPU 20, from the amount of blurring motion of the camera, finds the drive amount of the image blur compensation optical system of the image blur compensation mechanism such as to suppress blurring motion of the image on the film surface. According to this output Vout of the CPU 20, this is effected by the actuator drive circuits 59X, 59Y image blur compensation driving the VCM (voice coil) such that driving of the image blur compensation optical system in a plane at right angles to the optical axis is effected.

At t4, simultaneously, by means of the shutter device, the focusing lens drive and the exposure operation are performed. In this embodiment, a case is shown in which the same stepping motor is used to perform both drives.

Figure 20:
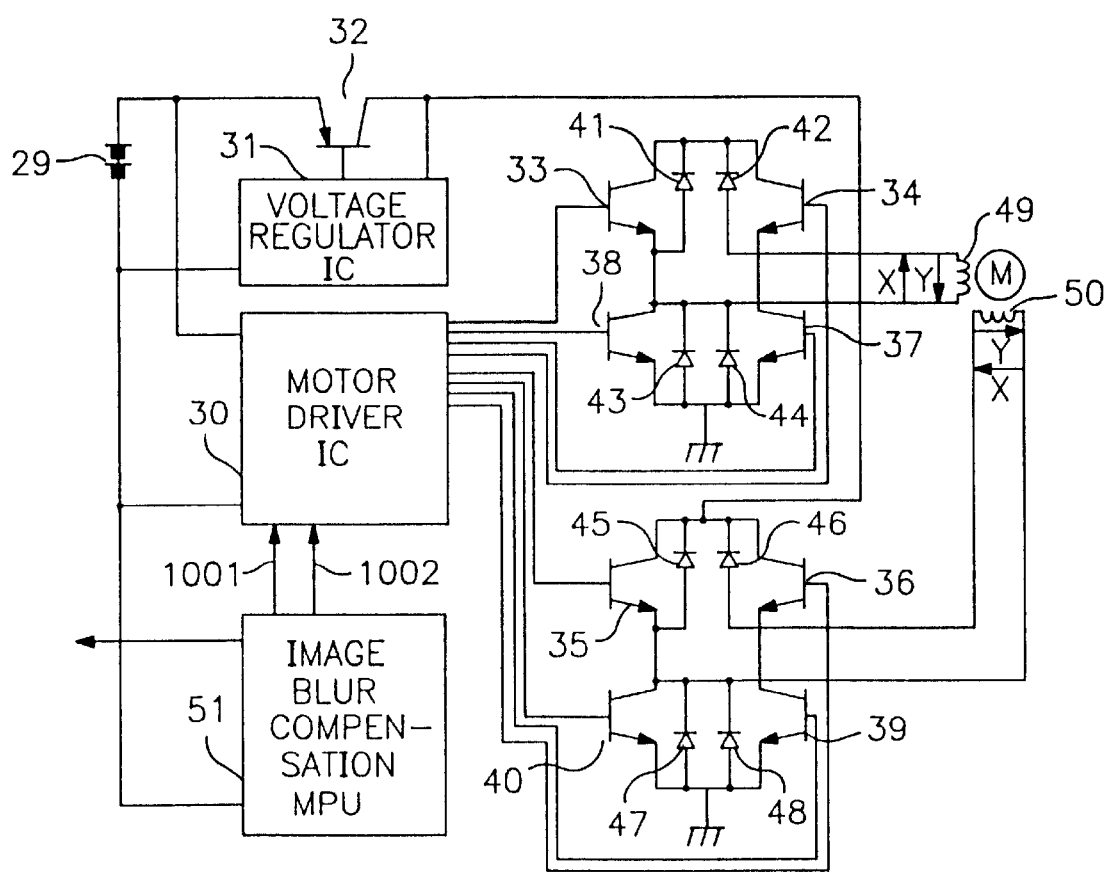
FIG. 20 is a constitutional block diagram of a shutter drive unit according to an embodiment of the present invention.

FIG. 20 is a constitutional block diagram of the shutter drive unit. The stepping motor drive signals 1001 and 1002 are for the well known two-phase magnet exciting type of motor, and are controlled by a digital signal. This signal forms a control signal from the CPU 20, and reaches the shutter drive unit (motor drive circuit) shown in FIG. 20.

This motor drive circuit is constituted by voltage regulator 31 and transistor 32, which usually supply a constant voltage to the motor, switching by using the digital signals 1001, 1002 from the image blur compensation MPU 51 to the motor driver IC 30 in order to drive the transistors 33–40 for motor drive use, and the stepping motors 49, 50.

The stepping motor drive transistors constitute two bridge circuits, which alternately reverse the current which flows to the two-phase stepping motors. Moreover, the reason that a voltage regulator is disposed in the drive power supply of the stepping motors is for the accurate control of the drive control by stabilizing the voltage, to bring about stabilization of the drive and exposure precision of the focusing lens.

The drive control of the stepping motor drive signals 1001 and 1002 and the stepping motors will next be described.

In FIG. 18, at the timing t4, the stepping motor drive signal 1001 and the stepping motor drive signal 1002 are both in phase, and are at a high level ("H" below), and the stepping motors are in a stable state.

At this time, because the stepping motor drive transistors 33 and 37, 35 and 39 are ON, current flows in the X direction in the stepping motor coils 49 and 50. Then, from the timing t4, the phases of the stepping motors alternately change. This time, the transistors 33 and 37 are cut off, and transistors 34 and 38 are set ON. At this time, the current of the stepping motor 49 reverses, flowing in the Y direction. By rotary action of this stepping motor, the focusing lens is extended by one step.

Next, the stepping motor drive signal 1002 changes from H to L. At this time, the transistors 35 and 39 are OFF, and the transistors 36 and 40 are ON. At this time, the current through the stepping motor coil 50 reverses, and flows in the Y direction. Simultaneously, the focusing lens is advanced by one step, and a total of two steps of extension are completed.

Next, proceeding in this manner, each time the direction in which the drive current flows to either stepping motor changes, the focusing lens extends by one step. Furthermore, the phase of the stepping motor drive signal 1001 changes from H to L. At this time, the transistors 34 and 38 are cut off, and the transistors 33 and 37 are turned ON. At this time, the current of the stepping motor 49 reverses, flowing in the X direction. At this time, the focusing lens performs one step of extension.

Then, at the timing of t4' (not shown in the drawings), by cutting off the current passing through the magnet for AF use (not shown in the drawing), the amount of extension of the focusing lens is accurately fixed.

Furthermore, the drive ring (not shown in the drawing) for use in driving the focusing lens drive, drives up to t5, in order to initiate the exposure preparation process of the shutter. This is because the control of the current passing through the stepping motor continues.

Next, at t6, the exposure action of the shutter commences. The shutter open drive action is from t6 up to t9, with from t10 up to t11 being the closing operation.

Furthermore, the operation from t12 up to t13 is the control operation of the stepping motors in order for the focusing lens to return to its initial position. The diodes 41–48 absorb the reverse power generated when there are steep changes in the current flowing in the coils, and prevent damage to the transistors or the motor driver IC.

Moreover, in the case that the phase of the stepping motor is changed, in order to prevent damage to the transistors by the current passing therethrough, when the signals change over, about 100 microseconds delay is arranged. Further, a time is arranged in which the transistors are all cut off.

In this embodiment, in order to reduce the effects of the drive noise of the stepping motors, the sampling timing of the position detection circuit and blurring motion detection circuit is displaced from the signal changeover time of the stepping motors. This situation is shown in FIG. 21.

Figure 21:
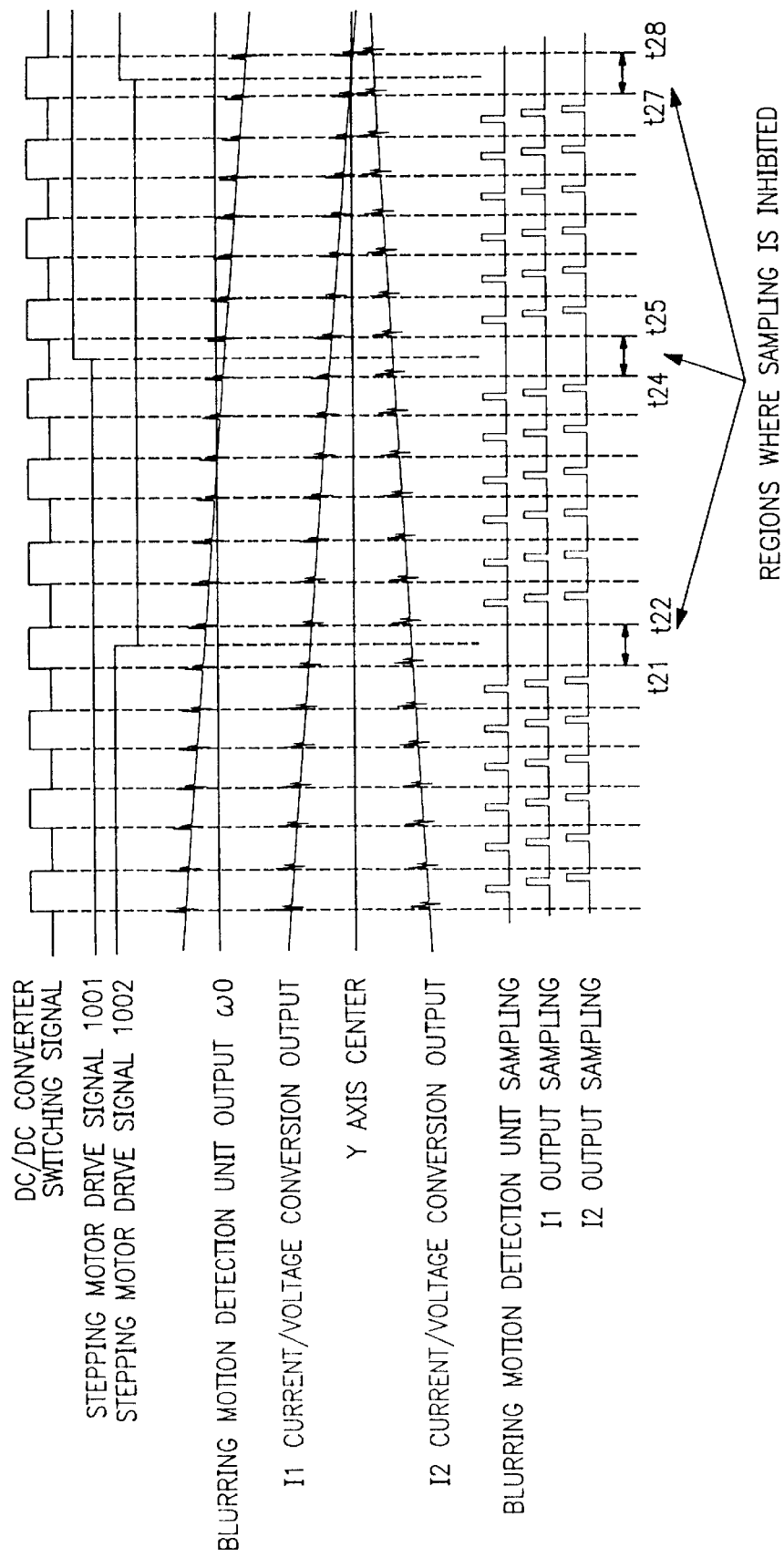
FIG. 21 is an operational time chart of an image blur compensation control unit according to an embodiment of the present invention.

FIG. 21 is a timing chart of the image blur compensation control unit. In FIG. 21, the inhibition timing in the Figure is t21–t22, t24–t25, t27–28.

Namely, at the timings t21, t24, and t27, after the signals passing through to the stepping motor have changed over, during the interval lasting a predetermined time until the effects due to noise generation have settled down, the blurring motion detection elements of angular velocity and the position detection operation of the image blur compensation optical system are inhibited. This time, for which the amount of noise generated is different, is tens of microseconds.

Then, at the time when the stabilization time of each circuit output has elapsed, the CPU 20 performs angular velocity detection and the integrating calculation of the angular velocity, calculates the specified drive destination, performs position detection of the image blur compensation optical system, does a current to voltage conversion of the current from the PSD, A/D converts the voltage amplified output, and performs a calculation to find the position of the image blur compensation optical system, repeating this process for a predetermined time interval.

Moreover, at the timing of changeover of the current passing through the stepping motor, the operations of the angular velocity detection process and of the position detection process are inhibited.

FIG. 22 is a position output waveform diagram of the image blur compensation optical system according to a preferred embodiment of the present invention. FIG. 23 is an output waveform diagram of the blurring motion detection circuit. FIGS. 22 and 23 are a bad example of a case in which control of sampling timing of noise elimination in this manner was not performed, and are waveforms in which the timing of t4 through t11 was excerpted.

In the case that the sampling of the angular velocity detection and position detection were performed directly after the drive signals of the stepping motors changed, the respective outputs are greatly affected by noise. This is due to changes in the currents flowing in coils for use by the motors, current induction, and the action of magnetic fields, and generates a great deal of electromagnetic noise.

As a result, even if blurring motion compensation control is performed by the image blur compensation mechanism, because the integration of the angular velocity and the position detection of the image blur compensation optical system are not accurately performed, the image blur compensation optical system, far from suppressing image blur, according to circumstances, increases image blur, as compared to the situation where no image blur compensation may be obtained.

Moreover, in this embodiment, the angular velocity detection and the position detection of the image blur compensation optical system are sampled, displaced in phase, after a predetermined time has elapsed, and are caused to be synchronous with the switching timing of the DC/DC converter 64.

Figure 24:
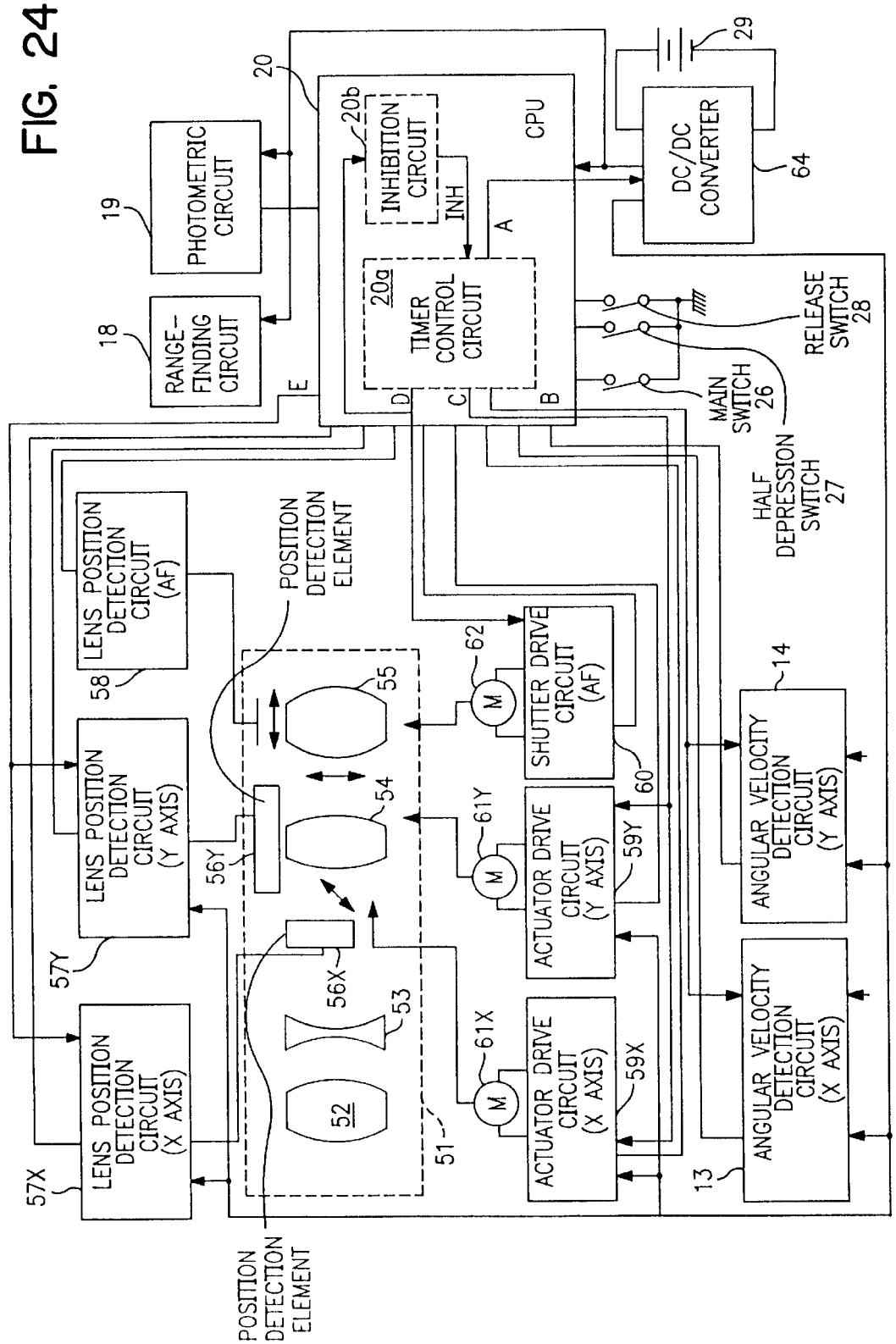
FIG. 24 is a constitutional block diagram of an image blur compensation device according to the second preferred embodiment of the present invention.

FIG. 24 is a constitutional block diagram of a second embodiment of an image blur compensation device according to the present invention.

Figure 25:
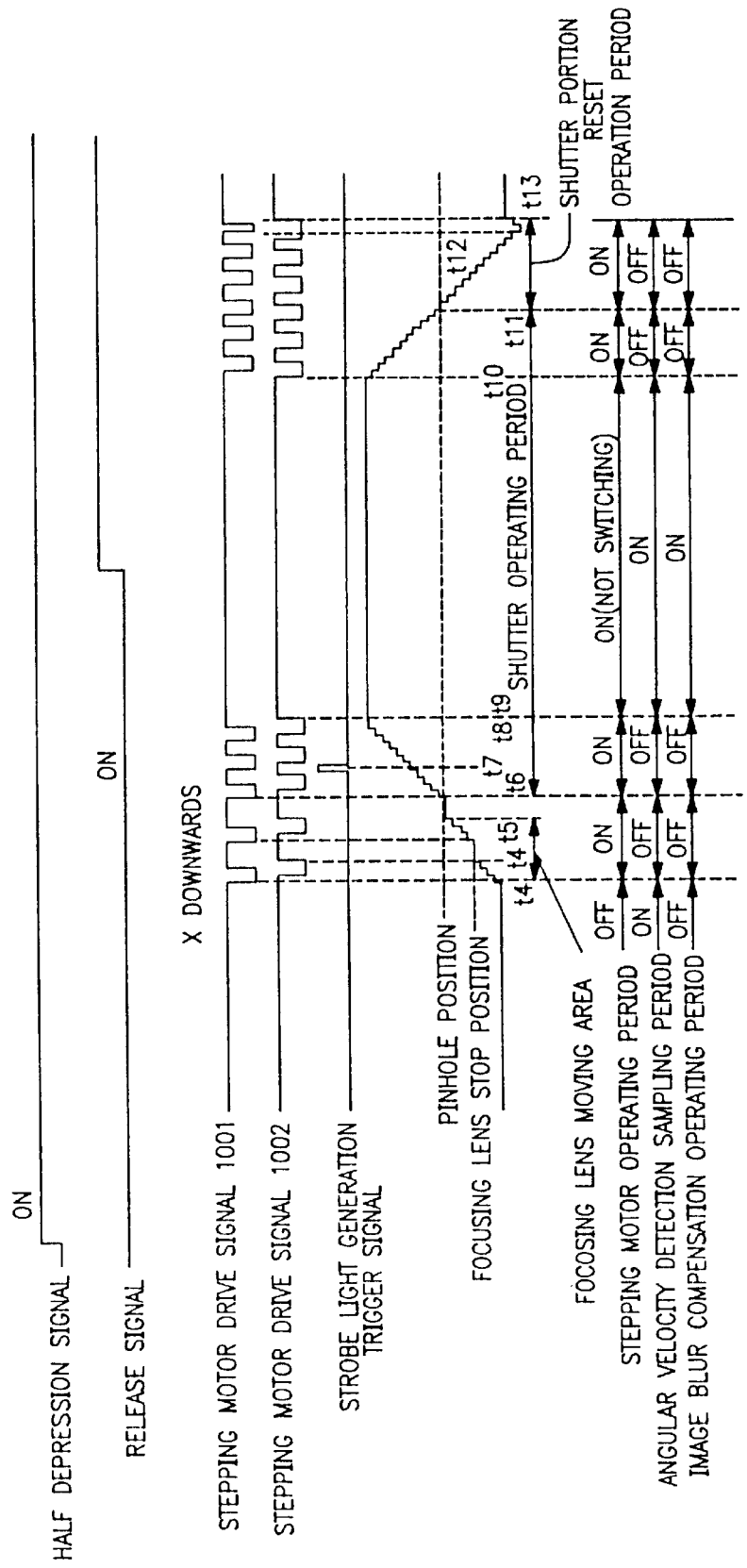
FIG. 25 is an operational time chart of an image blur compensation control unit according to an embodiment of the present invention.

In the second embodiment, an inhibition circuit 20b is disposed in the CPU 20. The inhibition circuit 20b recognizes states during shutter driving and focusing driving by using control signal D, inhibits the image blur compensation control of the image blur compensation optical system, and performs open control to the position directly before inhibition of position control of the image blur compensation optical system. This situation is shown in FIG. 25 (a timing chart of the operation of the image blur compensation control unit).

Preconditions of this case are that the effect of the switching of the DC/DC converter 64 is small, and that the switching noise of the stepping motor is large.

The control of the camera from half depression to release is the same as in the first embodiment. When the release button is fully depressed, from the focusing lens drive up to the shutter opening operation, because the current passing through the stepping motor changes phase in an interval of a number of milliseconds, switching noise occurs frequently.

Accordingly, just as in the treatment of the first embodiment, it is considered that there are cases in which the effect of the switching noise of the stepping motor is not completely eliminated. In this kind of case, during the stepping motor drive, the process operations are interrupted.

In other words, the image blur compensation control is interrupted from t4 up to t9 of FIG. 25, and from t9 until a predetermined time has elapsed, the angular velocity detection and the image blur compensation are not resumed. Because stepping motors also operate in the interval from t10 up to t13, the image blur compensation process ends at t10, and the image blur compensation optical system is under open control drive to the position directly before t10. This time, the effect of the image blur compensation during the exposure is more manifest when the shutter speed becomes long. This is because the time in which the stepping motor is driven, both the opening time and the closing time, is about 10 milliseconds, and if the total exposure time becomes 100 milliseconds or more, the proportion of the time in which image blur compensation cannot be performed to the total exposure time becomes small, and a sufficient effect is obtained in this system.

Consequently, based on the shutter speed, the second embodiment is performed at low speed. In the case that the exposure time is 100 milliseconds or less, the first embodiment may be used.

Figure 26:
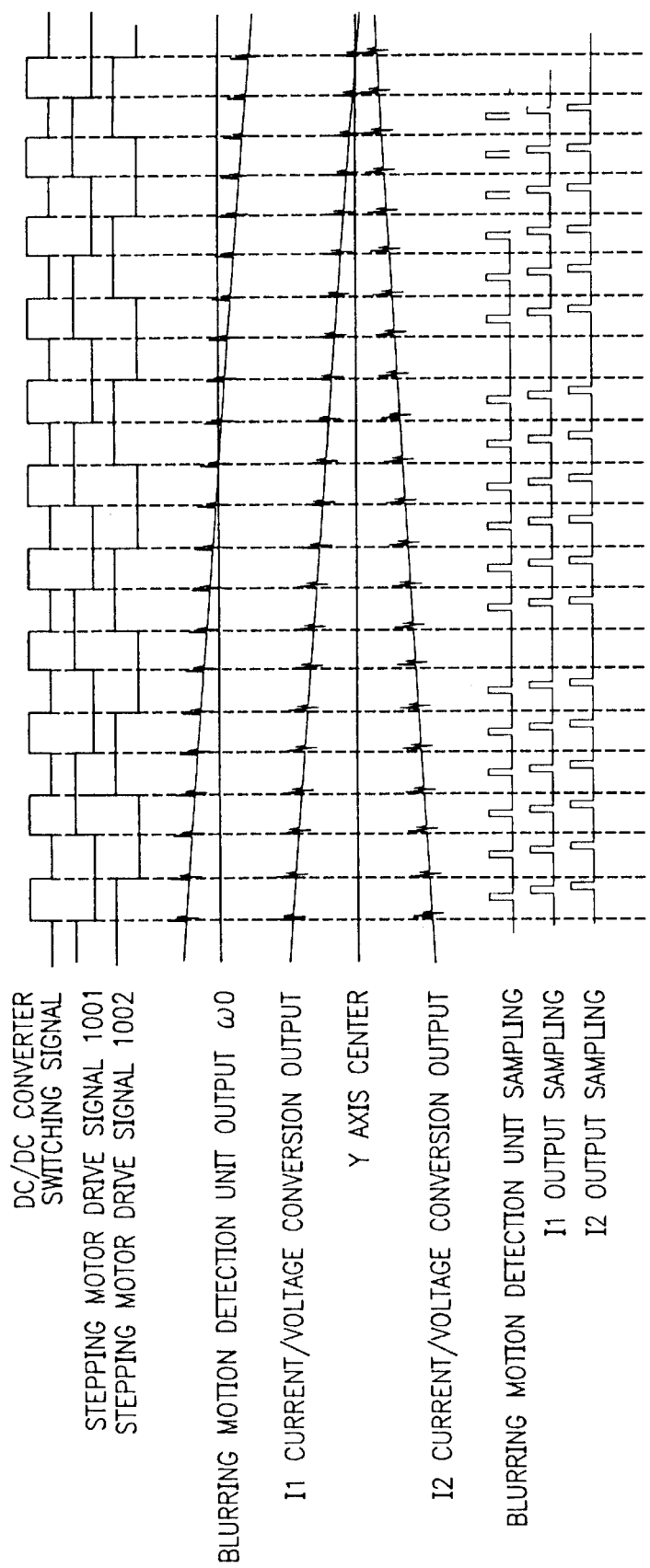
FIG. 26 is a time chart of an image blur compensation operation of an image blur compensation device according to the third embodiment of the present invention.
Figure 27:
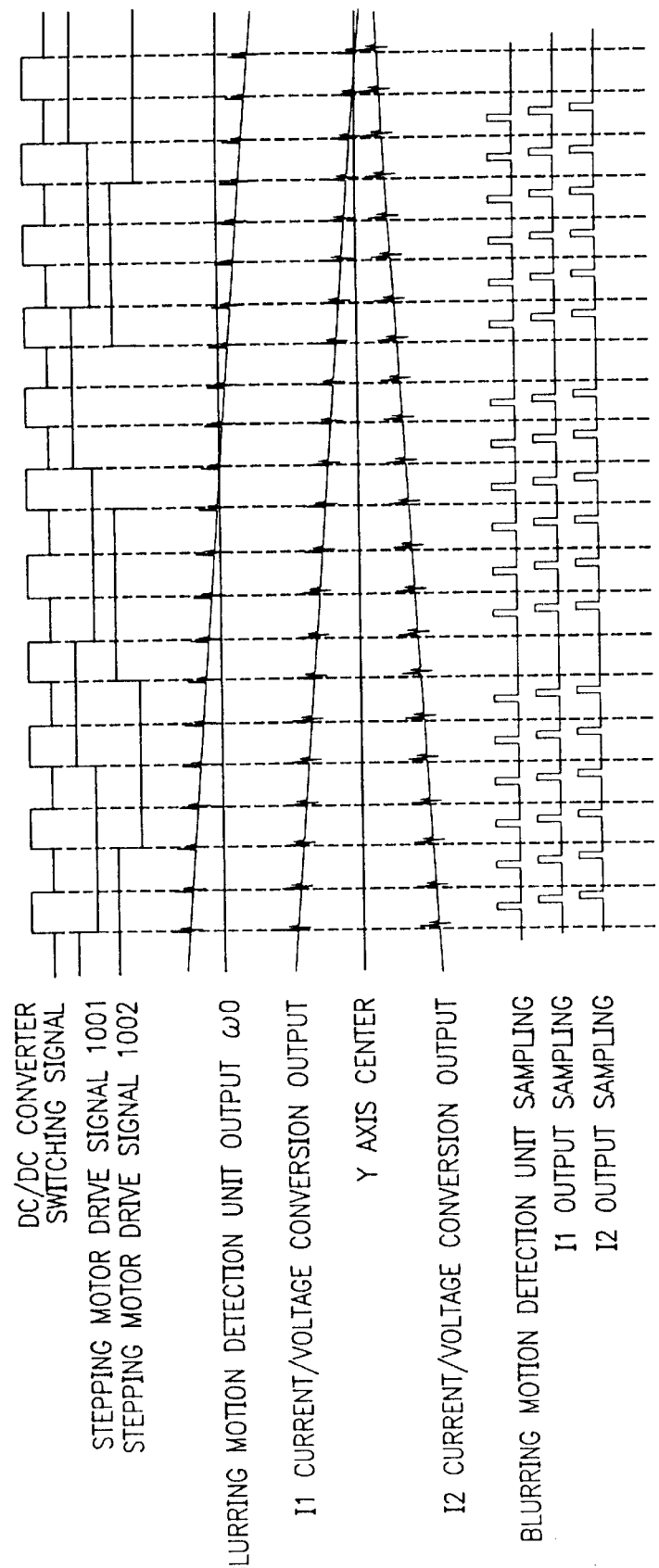
FIG. 27 is a time chart of an image blur compensation operation of an image blur compensation device according to the third embodiment of the present invention.
Figure 28:
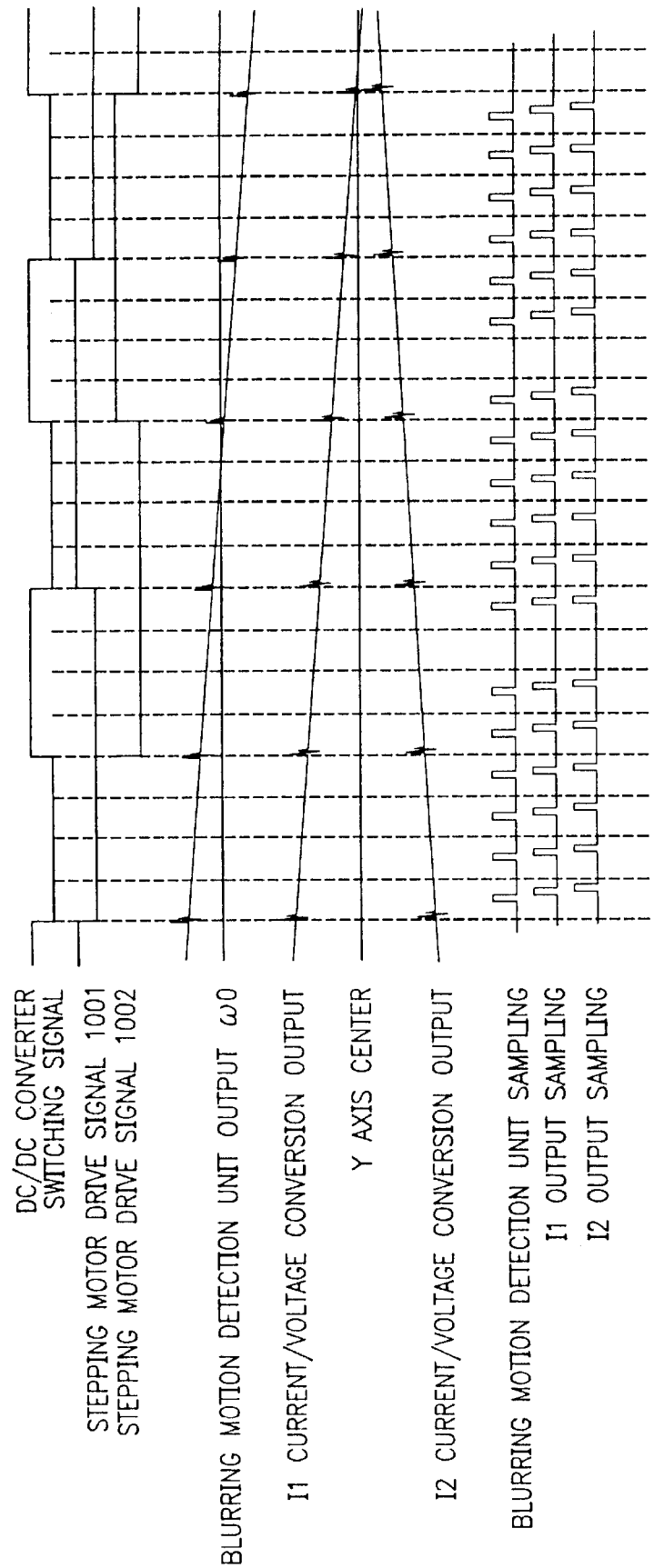
FIG. 28 is a time chart of an image blur compensation operation of an image blur compensation device according to the third embodiment of the present invention.

FIGS. 26–28 are time charts of image blur compensation operation of an image blur compensation device according to a third embodiment of the present invention.

FIG. 26 is a case in which the DC/DC converter 64 and the motor kind of switching noise as well as angular velocity detection and position detection of the image blur compensation optical system were made simultaneous.

In order to attain this, the DC/DC converter 64 may stop step-up when set above the necessary maximum frequency for the step-up capacity.

Relating to the period of current passing in one of the stepping motors, the characteristic of the shutter opening and closing time may be matched to the frequency of the DC/DC converter 64. However, if completely the same frequency is difficult to obtain, the use of the DC/DC converter 64 is set to a frequency divided frequency. FIG. 27 is a timing chart of the operation of this case.

By this system, because the detection processes and stepping motor do not result in important data becoming ineffective as in the first embodiment, control can be attained in which non-uniformity in data collection and the drive period of the image blur compensation optical system do not occur. Thus, more accurate image blur compensation of the image blur compensation optical system is possible.

Moreover, as shown in FIG. 28, for the angular velocity detection process, in relation to the frequency of the position detection process of the image blur compensation optical system, the oscillation frequency of the DC/DC converter 64 and the changeover period of the current passing through the stepping motor are constituted for rapid execution. Because this feature reduces the frequency with which data is made ineffective by the occurrence of noise as in the first embodiment, non-uniformity due to missing data is remedied.

Figure 29:
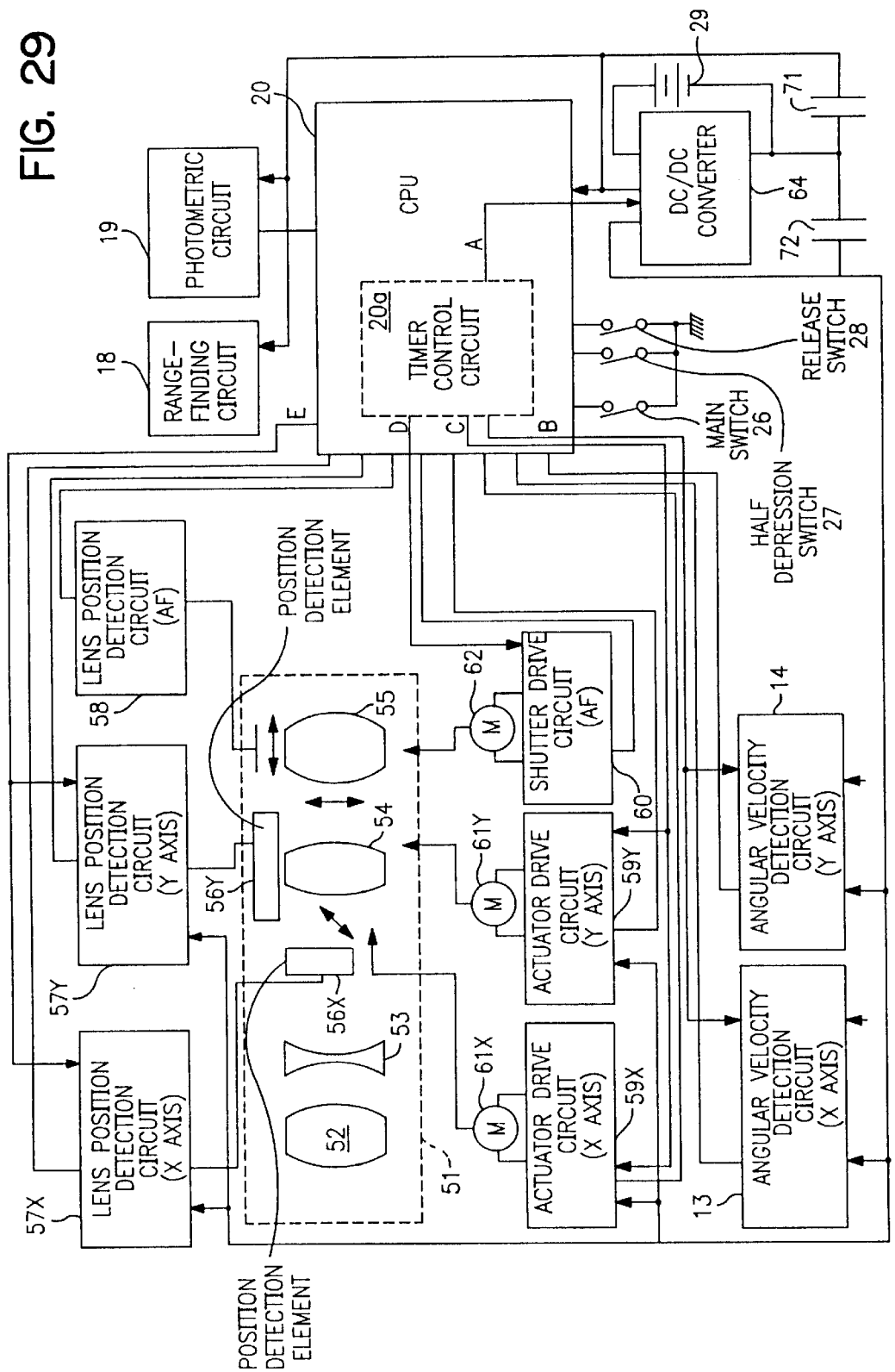
FIG. 29 is a constitutional block diagram of an image blur compensation device according to the fourth embodiment of the present invention.
Figure 30:
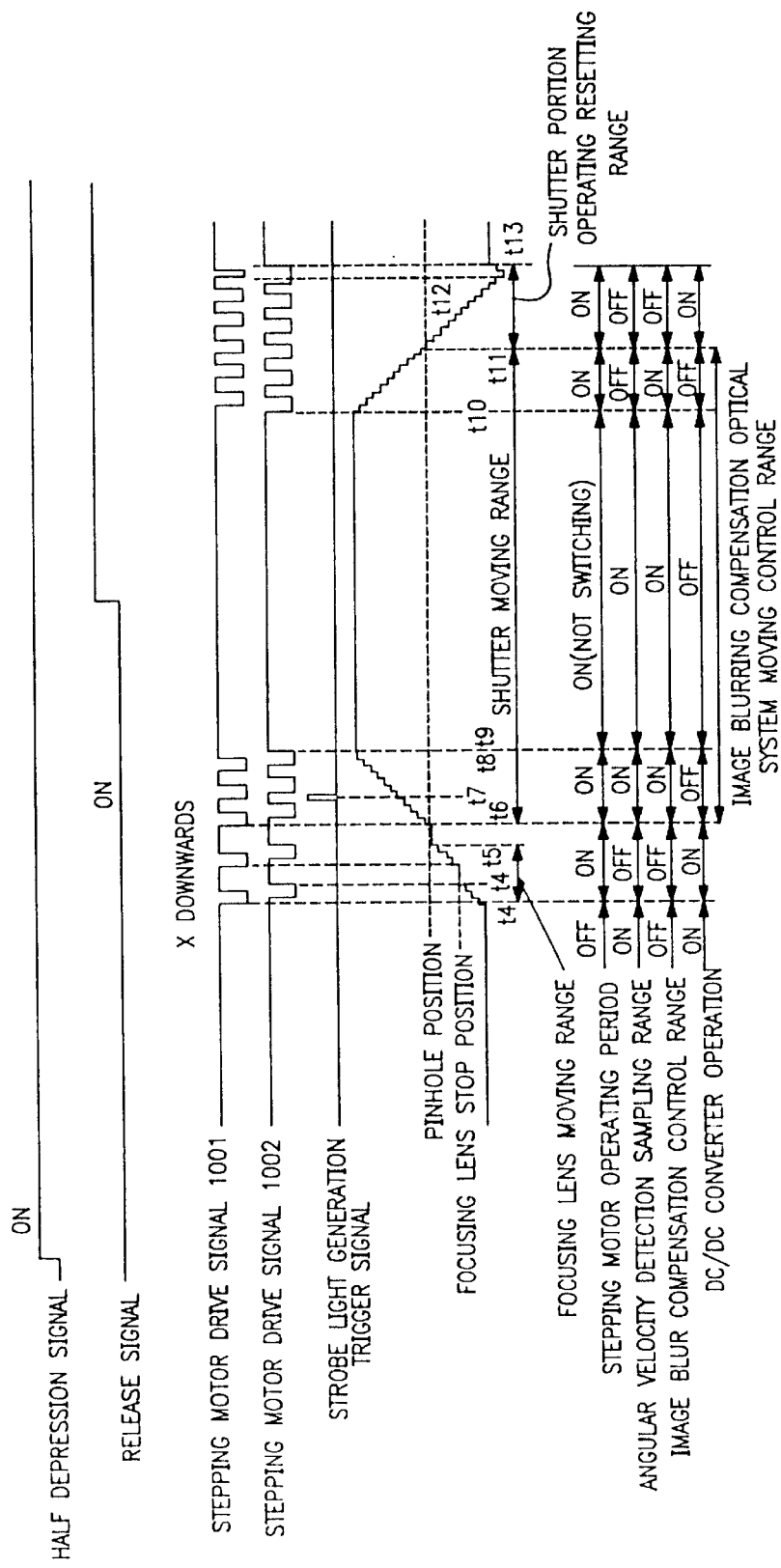
FIG. 30 is a time chart of an image blur compensation operation of an image blur compensation device according to the fourth embodiment of the present invention.
Figure 31:
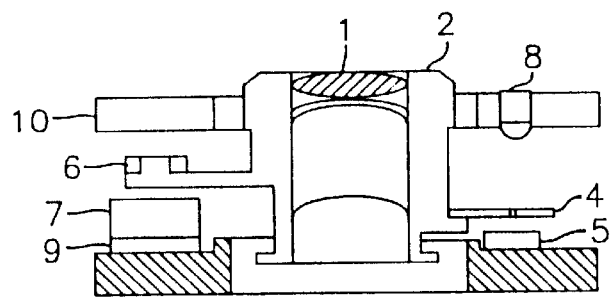
FIG. 31 is a side view cross sectional diagram of a prior art image blur compensation mechanism.
Figure 32A:
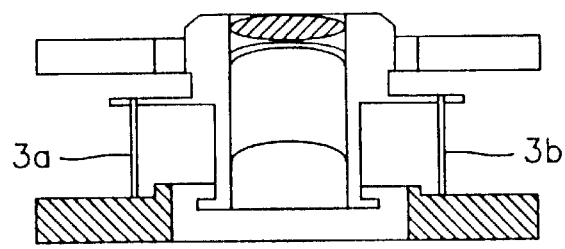
FIGS. 32(a) and 32(b) are cross sectional side views of a prior art image blur support structure of an image blur compensation mechanism where
Figure 32B:
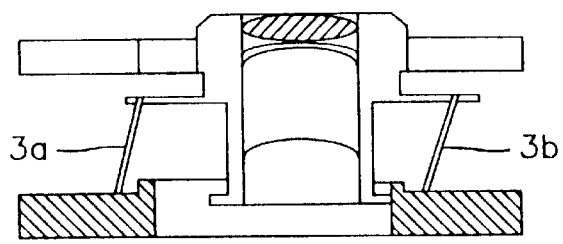

Next, FIG. 29 is a constitutional block diagram of an image blur compensation device according to a fourth embodiment of the present invention. FIG. 30 is a timing chart of the image blur compensation operation of the image blur compensation device of the fourth embodiment of the present invention.

In the fourth embodiment, large capacity backup capacitors 71, 72 are disposed in the output of the DC/DC converter 64. As these capacitors, electrical double layer capacitors and the like are used. FIG. 30 shows an example of the characteristics of this capacitor.

Normally, the DC/DC converter 64, in the middle of executing image blur compensation control and the like (t6–t11), is in a normal operation state. However, in the fourth embodiment, the DC/DC converter 64 is in the middle of driving the stepping motor, and also the period from t6 to t11, which is the timing which performs drive control of the image blur compensation optical system. The operation of the DC/DC converter is then stopped. By using the charge accumulated in the backup capacitors 71, 72 of FIG. 29, the power supply to each circuit continues.

In other words, the object is to suppress the generation of the switching noise of the DC/DC converter 64 during the performance of position detection of the image blur compensation optical system. This makes it possible to perform the image blur compensation control accurately.

The image blur compensation optical system 54 corresponds to the image blur compensation optical system. The IRED 8, slit plate 4, position detection element 5 (56X, 56Y), lens position detection circuit (57X, 57Y) and CPU 20 correspond to the position detection circuit.

The actuator (61X, 61Y), actuator drive circuit (59X, 59Y), and the CPU 20 equipped with the timer circuit 20a and inhibition circuit 20b, correspond to the image blur compensation drive unit.

The battery 29 and DC/DC converter 64 entirely correspond to the power supply circuit. The lens position detection circuit 58, the stepping motor 62, the shutter drive circuit 60 and the CPU 20 entirely correspond to the focusing lens drive unit.

The actuator 62, shutter drive circuit 60, and the CPU 20 entirely correspond to the shutter drive unit. The angular velocity detection circuit (13, 14) and the CPU 20 entirely correspond to the blurring motion detection unit.

In accordance with the preferred embodiments of the present invention as described above, while carrying out the blurring motion amount detection and position detection of the image blur compensation optical system of a camera, because the operations are inhibited by timing the generation of noise, and in the case that no noise is considered to arise the inhibition is cancelled, unavoidably generated noise can be avoided, and the effects of noise can be effectively reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image blur compensation device comprising:
   an image blur compensation optical system to compensate for image blur arising due to blurring motion of an optical instrument;
   a position detection unit to detect the position of the image blur compensation optical system;
   an image blur compensation drive unit to drive the image blur compensation optical system based on the detection result of the position detection unit and
   a power supply circuit to perform power supply to the position detection unit and the image blur compensation drive unit by a switching step-up control;
   wherein the image blur compensation drive unit includes an inhibition device to shift the sampling timing of the position detection unit, in a fixed period during which a switching phase of the power supply circuit has changed.

2. An image blur compensation device, comprising:
   an image blur compensation optical system to compensate for image blur arising due to blurring motion of an optical instrument with a photographic lens;
   a position detection unit to detect a position of the image blur compensation optical system;
   an image blur compensation drive unit to drive the image blur compensation optical system based on the detection result of the position detection unit; and
   a focusing lens drive unit which drives the photographic lens to a focused position;
   wherein the image blur compensation drive unit includes an inhibition device to shift the sampling timing of the position detection unit, within an operation period of the focusing lens drive unit.

3. An image blur compensation device comprising:
   an image blur compensation optical system to compensate for image blur arising due to blurring motion of an optical instrument with a shutter;
   a position detection unit to detect the position of the image blur compensation optical system;
   an image blur compensation drive unit to drive the image blur compensation optical system, based on the detection result of the position detection unit; and
   a shutter drive unit to perform driving of the shutter;
   wherein the image blur compensation drive unit includes an inhibition device to shift the sampling timing of the position detection unit within the operation period of the shutter drive unit.

4. An image blur compensation device comprising:
   a blurring motion detection unit to detect the amount of blurring motion of an optical instrument;
   an image blur compensation optical system to compensate for image blur arising due to blurring motion of the optical instrument;
   a position detection unit to detect the position of the image blur compensation optical system;
   an image blur compensation drive unit to drive the image blur compensation optical system, based on an output result of the blurring motion detection unit and on an output result of the position detection unit, so as to suppress image blur; and
   a power supply circuit to perform power supply to the position detection unit, the blurring motion detection unit, and the image blur compensation drive unit by a switching step-up control;
   wherein the image blur compensation drive unit includes an inhibition device to shift the sampling timing of the position detection unit and the blurring motion detection unit, within a fixed period after a phase of the power supply circuit has switched.

5. An image blur compensation device comprising:
   a blurring motion detection unit to detect the amount of blurring motion of an optical device with an optical element;
   an image blur compensation optical system to compensate for image blur arising due to blurring motion of the optical device;
   a position detection unit to detect the position of the image blur compensation optical system;
   an image blur compensation drive unit to drive the image blur compensation optical system, based on an output result of the blurring motion detection unit and on an output result of the position detection unit, so as to suppress image blur;

a focusing lens drive unit to drive the optical element to a focused position; and a power supply circuit to perform power supply to the position detection unit, the blurring motion detection unit, and the image blur compensation drive unit by a switching step-up control;

wherein the image blur compensation drive unit includes an inhibition device to shift the sampling timing of the position detection unit and the blurring motion detection unit, within a period of operation of the focusing lens drive unit.

6. An image blur compensation device comprising:

a blurring motion detection unit to detect an amount of blurring motion of an optical device with a shutter;

an image blur compensation optical system to compensate for image blur arising due to blurring motion of the optical device;

a position detection unit to detect the position of the image blur compensation optical system;

an image blur compensation drive unit to drive the image blur compensation optical system, based on an output result of the blurring motion detection unit and on an output result of the position detection unit, so as to suppress image blur;

a shutter drive unit to drive the shutter; and a power supply circuit to supply power to the position detection unit, the blurring motion detection unit, and the image blur compensation drive unit by a switching step-up control;

wherein the image blur compensation drive unit includes an inhibition device to shift the sampling timing of the position detection unit and the blurring motion detection unit, within a period of operation of the shutter drive unit.

7. An image blur compensation device according to claim 6, wherein the image blur compensation drive unit includes a cancellation device to cancel the inhibition of the detecting by the detection unit in cases in which a state of a driving operation by the shutter drive unit during shutter opening does not change in a predetermined time.

8. An image blur compensation device, comprising:

a blurring motion detection unit to detect an amount of blurring motion of an optical device using film;

an image blur compensation optical system to compensate for image blur arising due to blurring motion of the optical device;

a position detection unit to detect a position of the image blur compensation optical system;

an image blur compensation drive unit to drive the image blur compensation optical system based on an output result of the blurring motion detection unit and on an output result of the position detection unit, so as to suppress image blur;

a shutter exposure control unit to control exposure of film in the optical device; and a power supply circuit to perform power supply to the position detection unit, the blurring motion detection unit, the shutter exposure control unit, and the image blur compensation drive unit by a switching step-up control;

wherein the image blur compensation drive unit includes an inhibition device to inhibit a switching control operation of the power supply circuit within a period of operation of the shutter exposure control unit.

9. An image blur compensation device comprising:

a blurring motion detection unit to detect an amount of blurring motion of an optical device with a shutter;

an image blur compensation optical system to compensate for image blur arising due to blurring motion of the optical device;

a position detection unit to detect a position of the image blur compensation optical system;

an image blur compensation drive unit to drive the image blur compensation optical system based on an output result of the blurring motion detection unit and on an output result of the position detection unit, so as to suppress image blur;

a shutter drive unit to drive the shutter; and a power supply circuit to perform power supply to the position detection unit, the blurring motion detection unit, the shutter drive unit, and the image blur compensation drive unit by a switching step-up control;

wherein the image blur compensation drive unit includes an inhibition device to inhibit a switching control operation of the power supply circuit within a period of operation of a drive control of the image blur compensation optical system.

10. An image blur compensation device according to claim 9, wherein the power supply circuit has at least one capacitor for backup use.

* * * * *

UNITED STATES PATENT AND TRADEMARK OFFICE
CERTIFICATE OF CORRECTION

PATENT NO. : 6,574,436 B2
DATED : June 3, 2003
INVENTOR(S) : Tadashi Otani et al.

It is certified that error appears in the above-identified patent and that said Letters Patent is hereby corrected as shown below:

Column 17,
Line 59, after "unit" insert -- ; --;
Line 62, after "control" change ";" to -- , --.

Column 18,
Line 12, after "position" change ";" to -- , --;
Line 27, after "shutter" change ";" to -- , --;
Line 49, after "control" change ";" to -- , --.

Column 19,
Lines 8 and 33, after "control" change ";" to -- , --.

Column 20,
Lines 17 and 39, after "control" change ";" to -- , --.

Signed and Sealed this

Third Day of February, 2004

JON W. DUDAS
*Acting Director of the United States Patent and Trademark Office*